United States Patent
Park et al.

(10) Patent No.: US 10,445,252 B2
(45) Date of Patent: Oct. 15, 2019

(54) STORAGE DEVICE AND OPERATING METHOD PERFORMED BY THE SAME

(71) Applicant: SAMSUNG ELECTRONICS CO., LTD., Suwon-si, Gyeonggi-do (KR)

(72) Inventors: Hyun-Chul Park, Suwon-si (KR); Bum-Hee Lee, Hwaseong-si (KR); Bo-Mi Seok, Anyang-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 92 days.

(21) Appl. No.: 15/624,892

(22) Filed: Jun. 16, 2017

(65) Prior Publication Data

US 2018/0137060 A1 May 17, 2018

(30) Foreign Application Priority Data

Nov. 11, 2016 (KR) .................. 10-2016-0150332

(51) Int. Cl.
*G06F 12/12* (2016.01)
*G06F 3/06* (2006.01)

(52) U.S. Cl.
CPC .............. *G06F 12/12* (2013.01); *G06F 3/064* (2013.01); *G06F 3/0608* (2013.01); *G06F 3/0611* (2013.01); *G06F 3/0652* (2013.01); *G06F 3/0659* (2013.01); *G06F 3/0673* (2013.01); *G06F 3/0679* (2013.01); *G06F 3/0688* (2013.01)

(58) Field of Classification Search
CPC ...... G06F 12/12; G06F 3/0608; G06F 3/0611; G06F 3/064; G06F 3/0652; G06F 3/0659; G06F 3/0673; G06F 3/0679; G06F 3/0688
See application file for complete search history.

(56) References Cited

U.S. PATENT DOCUMENTS

| | | | |
|---|---|---|---|
| 7,525,986 B2 | 4/2009 | Lee et al. | |
| 7,984,084 B2 | 7/2011 | Sinclair | |
| 8,037,234 B2 | 10/2011 | Yu et al. | |
| 8,411,496 B2 | 4/2013 | Hong | |
| 8,793,556 B1 | 7/2014 | Northcott et al. | |
| 9,158,670 B1 | 10/2015 | Kang et al. | |
| 9,244,617 B2 | 1/2016 | Bux et al. | |
| 2008/0270678 A1* | 10/2008 | Cornwell | G06F 3/061 711/103 |
| 2009/0006719 A1 | 1/2009 | Traister | |
| 2014/0137128 A1 | 5/2014 | Chang et al. | |
| 2015/0199137 A1* | 7/2015 | Shin | G06F 3/0611 711/103 |
| 2016/0117102 A1 | 4/2016 | Hong et al. | |

OTHER PUBLICATIONS

Jedec Standard, "Embedded Multi-Media Card (e.MMC) Electrical Standard (5.1.)", Feb. 2015.

* cited by examiner

*Primary Examiner* — Eric Cardwell
(74) *Attorney, Agent, or Firm* — F. Chau & Associates, LLC

(57) ABSTRACT

An operating method performed by a storage device includes selecting a first task from among a plurality of tasks queuing in a command queue of the storage device, checking a first block to be accessed by the first task using a mapping table loaded to the storage device, determining whether the first block is a read reclaim target or a replacement target, and determining an order of executing the first task depending on whether the first block is the read reclaim target or the replacement target.

19 Claims, 20 Drawing Sheets

| Status | Not Ready | Not Ready | Not Ready | ... | Not Ready | Not Ready | Ready | Ready |
|---|---|---|---|---|---|---|---|---|
| Task No. | N | N-1 | N-2 | ... | 4 | 3 | 2 | 1 |

| PA | READ RECLAIM | REPLACEMENT |
|---|---|---|
| PBN0 | 1 | 0 |
| PBN1 | 0 | 1 |
| ... | ... | ... |
| PBNn | 0 | 0 |

| PA (BLK, WL) | READ RECLAIM | REPLACEMENT |
|---|---|---|
| (0,0) | 1 | 0 |
| (0,1) | 0 | 1 |
| ... | ... | ... |
| (n,m) | 0 | 0 |

STORAGE DEVICE AND OPERATING METHOD PERFORMED BY THE SAME

CROSS-REFERENCE TO RELATED APPLICATION

This application claims priority under 35 U.S.C. § 119 to Korean Patent Application No. 10-2016-0150332, filed on Nov. 11, 2016 in the Korean Intellectual Property Office, the disclosure of which is incorporated by reference herein in its entirety.

TECHNICAL FIELD

Exemplary embodiments of the inventive concept relate to a storage device, and more particularly, to a storage device supporting a command queue function and an operating method performed by the storage device.

DISCUSSION OF RELATED ART

A flash memory, which is a non-volatile memory, may retain stored data even when its power supply is cut, interrupted, or disabled. Recently, storage devices including flash memories, such as embedded multi-media cards (eMMC), universal flash storage (UFS), solid-state drives (SSD), memory cards, or the like, are widely used. These storage devices are useful for storing or transferring large amounts of data.

SUMMARY

According to an exemplary embodiment of the inventive concept, an operating method performed by a storage device includes selecting a first task from among a plurality of tasks queuing in a command queue of the storage device, checking a first block to be accessed by the first task using a mapping table loaded to the storage device, determining whether the first block is a read reclaim target or a replacement target, and determining an order of executing the first task depending on whether the first block is the read reclaim target or the replacement target.

According to an exemplary embodiment of the inventive concept, an operating method performed by a storage device includes selecting a first command from among a plurality of commands queuing in a command queue of the storage device, checking a first block to be accessed by the first command using a mapping table loaded to the storage device, and adjusting an execution schedule with respect to the first command using degradation information regarding the first block.

According to an exemplary embodiment of the inventive concept, an operating method performed by a storage device includes receiving task setting and address commands for a first task from a host, checking tasks that newly queue in a command queue of the storage device, selecting the first task from among a plurality of tasks queuing in the command queue, checking a first block to be accessed by the first task using a mapping table loaded to the storage device, determining whether the first block is a read reclaim target or a replacement target, selecting a second task from among the plurality of tasks when the first block is the read reclaim target or the replacement target, and determining the first task to have a ready status when the first block is neither the read reclaim target nor the replacement target.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
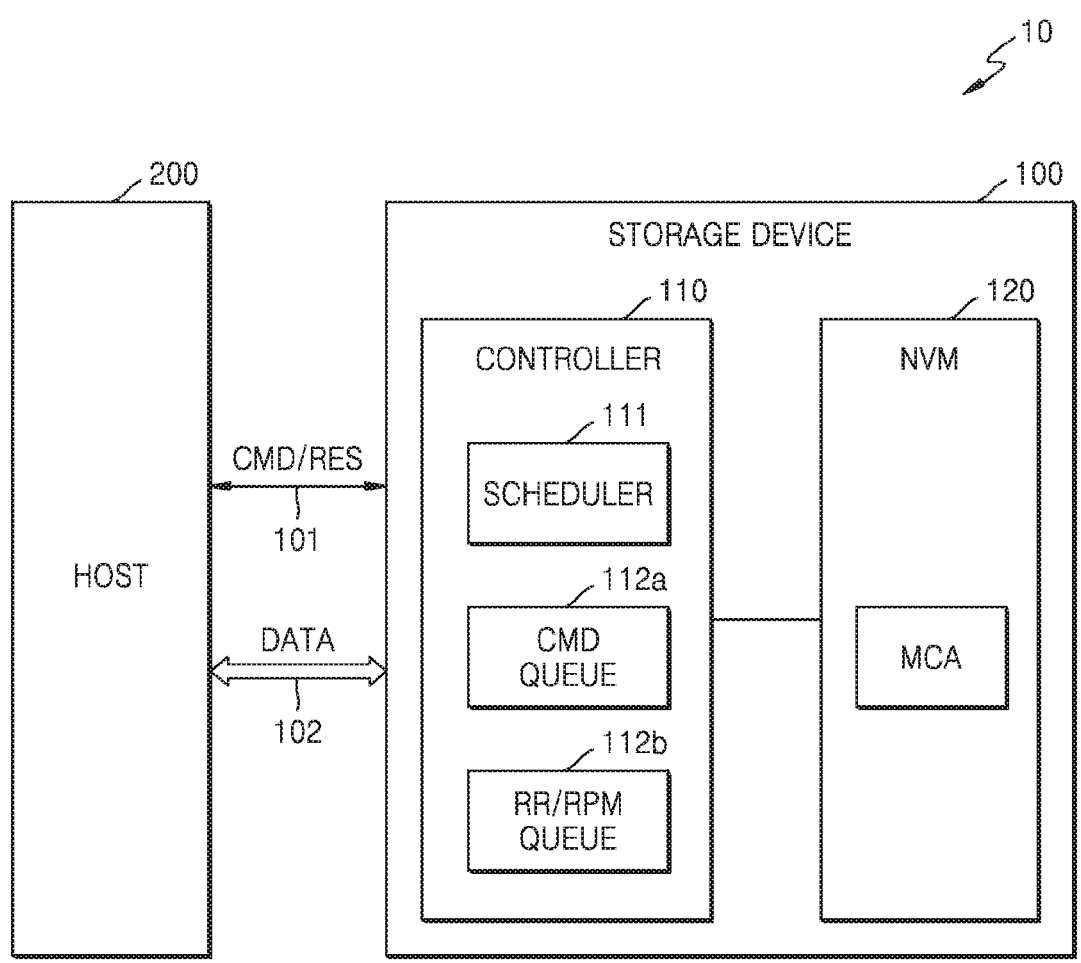
FIG. 1 is a block diagram of a storage system according to an exemplary embodiment of the inventive concept.

Exemplary embodiments of the inventive concept will be described more fully hereinafter with reference to the accompanying drawings. Like reference numerals may refer to like elements throughout this application.

FIG. 1 is a block diagram of a storage system according to an exemplary embodiment of the inventive concept.

Referring to FIG. 1, a storage system 10 may include a storage device 100 and a host 200, and the storage device 100 may include a controller 110 and a non-volatile memory 120. Via a command channel 101, a command CMD may be transmitted from the host 200 to the storage device 100, and in response to the command CMD, a response RES may be transmitted from the storage device 100 to the host 200. In addition, via a plurality of data channels 102, data for a write operation may be transmitted from the host 200 to the storage device 100, and data for a read operation may be transmitted from the storage device 100 to the host 200.

The controller 110 may include a scheduler 111 and a command queue 112a. The controller 110 may sequentially receive a plurality of commands CMD from the host 200 via the command channel 101, and the plurality of commands CMD may queue in the command queue 112a. Accordingly, the storage device 100 may perform asynchronous input and output operations of receiving a new command CMD while the storage device 100 performs an operation based on a previously received command CMD, so that an operational speed of the storage device 100 may be sharply increased. The storage device 100 may be referred to as a queuing device, and hereinafter, exemplary embodiments of the inventive concept to be described below may be applied to storage devices, e.g., queuing devices, that support a command queue function.

The scheduler 111 may determine an order of executing the commands CMD queued in the command queue 112a. In more detail, the scheduler 111 may determine the order of executing the commands CMD, based on degradation information regarding blocks to be accessed by the commands CMD. In this manner, the scheduler 111 may perform an out-of-order scheduling operation, so that the commands CMD may be executed according to the order determined by the scheduler 111, as opposed to an order that the commands CMD are queued in the command queue 112a.

In this regard, a block to be accessed by the command CMD refers to a block indicated by a physical address according to the command CMD, where the block is one of a plurality of memory blocks included in the non-volatile memory 120. According to exemplary embodiments of the inventive concept, the degradation information may be stored according to each of the blocks, each of pages, or a block and page. For example, the degradation information may include at least one of a number of read times, a number of program/erase times, a number of error bits of read data, program elapsed time information, or operation temperature information.

In the present exemplary embodiment, the controller 110 may further include a read reclaim/replacement (RR/RPM) queue 112b. The RR/RPM queue 112b may store the degradation information according to each block and/or each page, where the degradation information indicates a read reclaim target or a replacement target. The scheduler 111 may determine the order of executing the commands CMD queued in the command queue 112a, based on the RR/RPM queue 112b. The read reclaim and replacement process will be described below with reference to FIGS. 8 through 9B.

The non-volatile memory 120 may include a memory cell array MCA. In the present exemplary embodiment, the memory cell array MCA may include a plurality of flash memory cells that may each be a NAND flash memory. However, the inventive concept is not limited thereto, and the memory cell array MCA may include memory cells that may be resistive memory cells such as a resistive random-access memory (ReRAM), a phase change RAM (PRAM), a magnetic RAM (MRAM), or the like.

In the present exemplary embodiment, the memory cell array MCA may be a three-dimensional (3D) memory array. The 3D memory array is monolithically formed as one or more physical levels of arrays of memory cells having an active area disposed above a silicon substrate and circuitry associated with the operation of those memory cells, whether such associated circuitry is above or within such substrate. The term "monolithically" indicates that layers having the physical levels and constituting the memory cell array are stacked in a manner such that a layer having an upper level is directly stacked on a layer having a lower level. In the present exemplary embodiment, the 3D memory array includes vertical NAND strings that are vertically disposed so that at least one memory cell is positioned on another memory cell. The at least one memory cell may include a charge trap layer.

The following patent documents, which are incorporated by reference herein in their entireties, describe suitable configurations for 3D memory arrays, in which the 3D memory array is configured as a plurality of levels, with word lines and/or bit lines shared between the plurality of levels: U.S. Pat. Nos. 7,679,133, 8,553,466, 8,654,587, and 8,559,235, and US Pat. Pub. No. 2011/0233648.

The host 200 may communicate with the storage device 100 via various interfaces, and may control a data processing operation, e.g., a data read operation or a data write operation by the storage device 100. In the present exemplary embodiment, the host 200 may be a central processing unit (CPU), a processor, a microprocessor, or an application processor (AP). In the present exemplary embodiment, the host 200 may be embodied as a System-on-a-Chip (SoC).

The storage device 100 may be embodied as a personal computer (PC), a data server, a network-attached storage (NAS), an Internet of Things (IoT) apparatus, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an electronic-book (e-book) reader, a wearable device, or the like.

According to exemplary embodiments of the inventive concept, the storage device 100 may be an internal memory embedded in an electronic device. For example, the storage device 100 may be an embedded multi-media card (eMMC), a solid-state drive (SSD), or an embedded universal flash storage (UFS) memory device. According to exemplary embodiments of the inventive concept, the storage device 100 may be a UFS memory card, a compact flash (CF) memory, a secure digital (SD) memory, a micro secure digital (Micro-SD) memory, a mini-SD memory, an extreme digital (xD) memory, or a memory stick.

Figure 2:
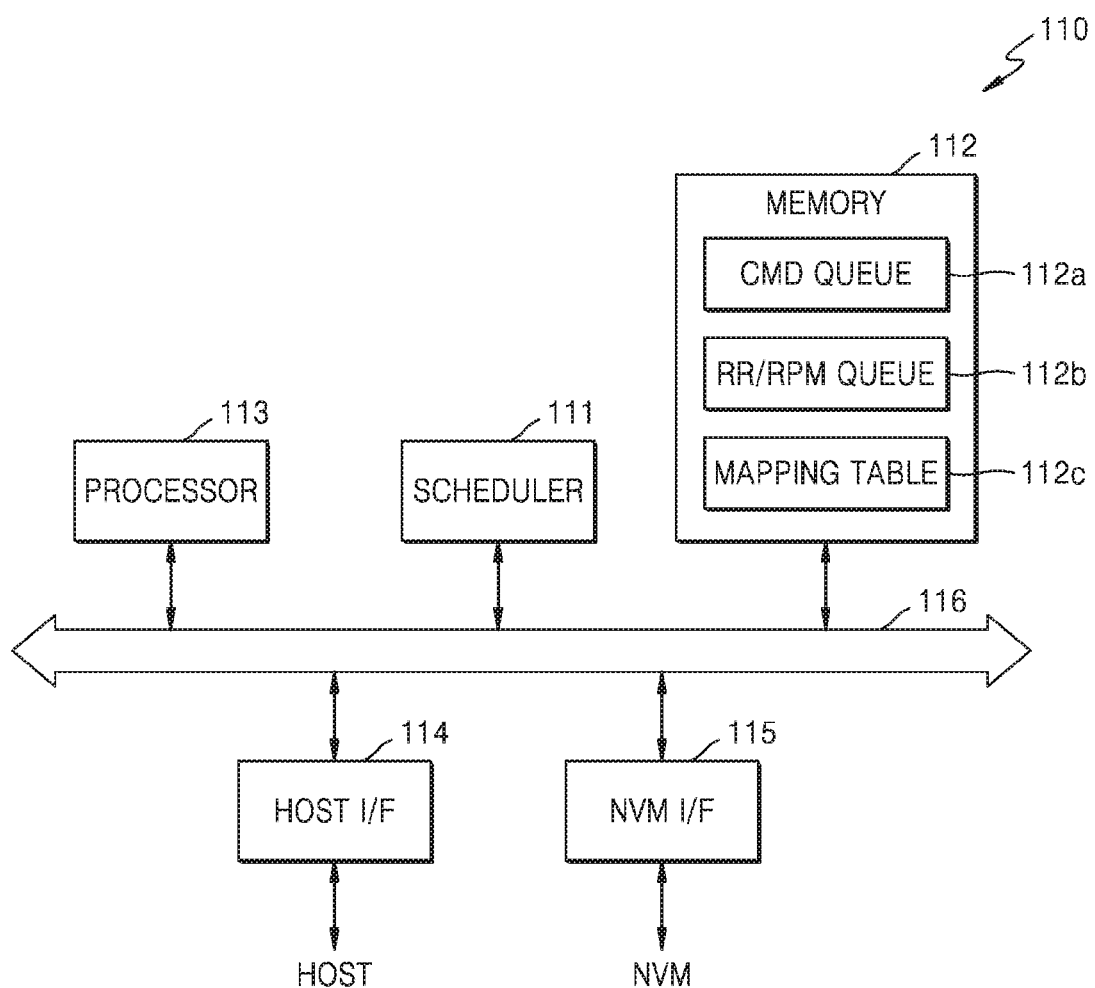
FIG. 2 is a block diagram of a controller included in a storage device of FIG. 1 according to an exemplary embodiment of the inventive concept.

FIG. 2 is a block diagram of a controller included in a storage device of FIG. 1 according to an exemplary embodiment of the inventive concept.

Referring to FIG. 2, the controller 110 may include the scheduler 111, a memory 112, a processor 113, a host interface 114, and a non-volatile memory interface 115 that are capable of communicating with one another through a bus 116. The processor 113 may include a CPU, a microprocessor, or the like, and may control all operations performed by the controller 110.

The scheduler 111 may be embodied as hardware, software, or firmware. When the scheduler 111 is embodied as software or firmware, the scheduler 111 may be loaded to the memory 112, and may operate by control of the processor 113. The memory 112 may be used as an operational memory, a buffer memory, a cache memory, or the like. For example, the memory 112 may be embodied as a dynamic random access memory (DRAM), a static random access memory (SRAM), a PRAM, or a flash memory. The command queue 112a, the RR/RPM queue 112b, and a mapping table 112c may be loaded to the memory 112.

The host interface 114 may provide an interface between the host 200 and the controller 110. For example, the host interface 114 may provide an interface using a universal serial bus (USB), an MMC, a PCI Express (PCI-E), an AT attachment (ATA), a serial AT attachment (SATA), a parallel AT attachment (PATA), a small computer system interface (SCSI), a serial attached SCSI (SAS), an enhanced small disk interface (ESDI), an integrated drive electronics (IDE), or the like.

The non-volatile memory interface 115 may provide an interface between the controller 110 and the non-volatile memory 120. For example, degradation information, a mapping table, write data, and read data may be exchanged between the controller 110 and the non-volatile memory 120 via the non-volatile memory interface 115.

Figure 3:
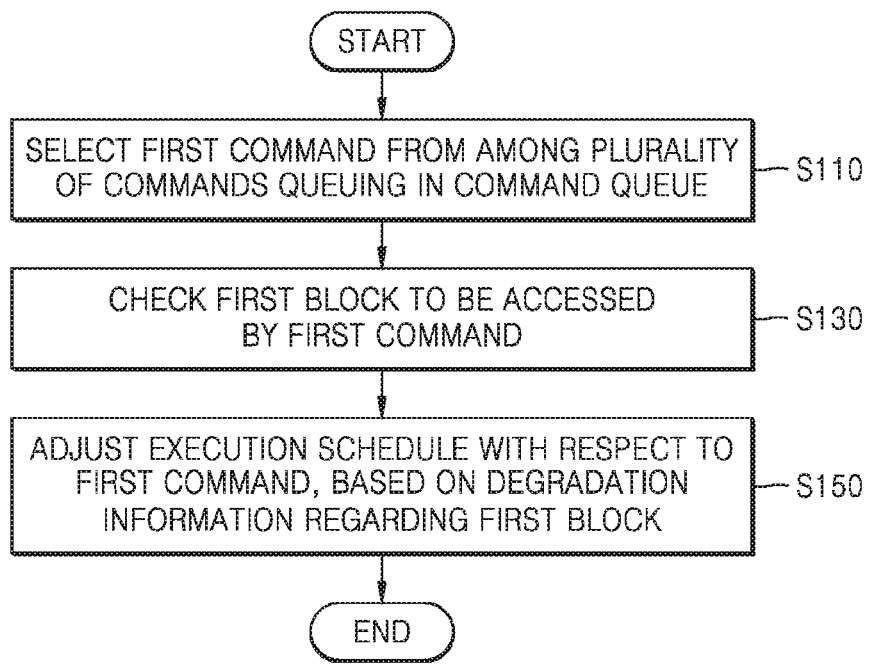
FIG. 3 is a flowchart of an operating method performed by a storage device according to an exemplary embodiment of the inventive concept.

FIG. 3 is a flowchart of an operating method performed by a storage device according to an exemplary embodiment of the inventive concept. Hereinafter, the operating method performed by the storage device will now be described with reference to FIGS. 1 through 3. The operating method performed by the storage device according to the present exemplary embodiment may include operations that are performed in chronological order by the storage device 100 of FIG. 1. The descriptions described above with reference to FIGS. 1 and 2 may also be applied to the present exemplary embodiment, and thus are not provided here.

In operation S110, a first command is selected from among a plurality of commands queuing in a command queue. For example, the scheduler 111 may select the first command from among the plurality of commands queuing in the command queue 112a. In the present exemplary embodiment, the first command may be a read command. For example, the scheduler 111 may select the first command, based on the mapping table 112c. The non-volatile memory 120 may store a plurality of mapping tables, and when power is applied to the storage device 100, some of the mapping tables stored in the non-volatile memory 120 may be loaded to the memory 112. The scheduler 111 may select a command from among the commands queuing in the command queue 112a, and a mapping table corresponding to an address according to the command is loaded to the memory 112. The first command may be a write command. The scheduler 111 may select the first command according to an order by which the commands are queued in the command queue 112a.

In operation S130, a first block to be accessed by the first command is checked. Here, the first block is a physical block to be accessed by the first command, and for example, the scheduler 111 may check the first block to be accessed by the first command, by using or taking into account the mapping table 112c. However, the inventive concept is not limited thereto, and according to exemplary embodiments of the inventive concept, the scheduler 111 may further check a first page to be accessed by the first command, by using the mapping table 112c.

In operation S150, an execution schedule with respect to the first command is adjusted based on degradation information regarding the first block. In the present exemplary embodiment, the degradation information may indicate whether the first block is a read reclaim target or a replacement target. For example, when the first block is the read reclaim target or the replacement target, the scheduler 111 may delay an execution order of the first command, and may select another command from among the plurality of commands queuing in the command queue 112a. When the first block is neither the read reclaim target nor the replacement target, the scheduler 111 may transmit an execution request with respect to the first command to the host 200. However, the inventive concept is not limited thereto in an exemplary embodiment of the inventive concept For example, the degradation information may indicate whether the first block is an erase target. In an exemplary embodiment of the inventive concept, the degradation information may include a number of read times, a program/erase cycle, error bit information, or the like regarding the first block.

Figure 4:
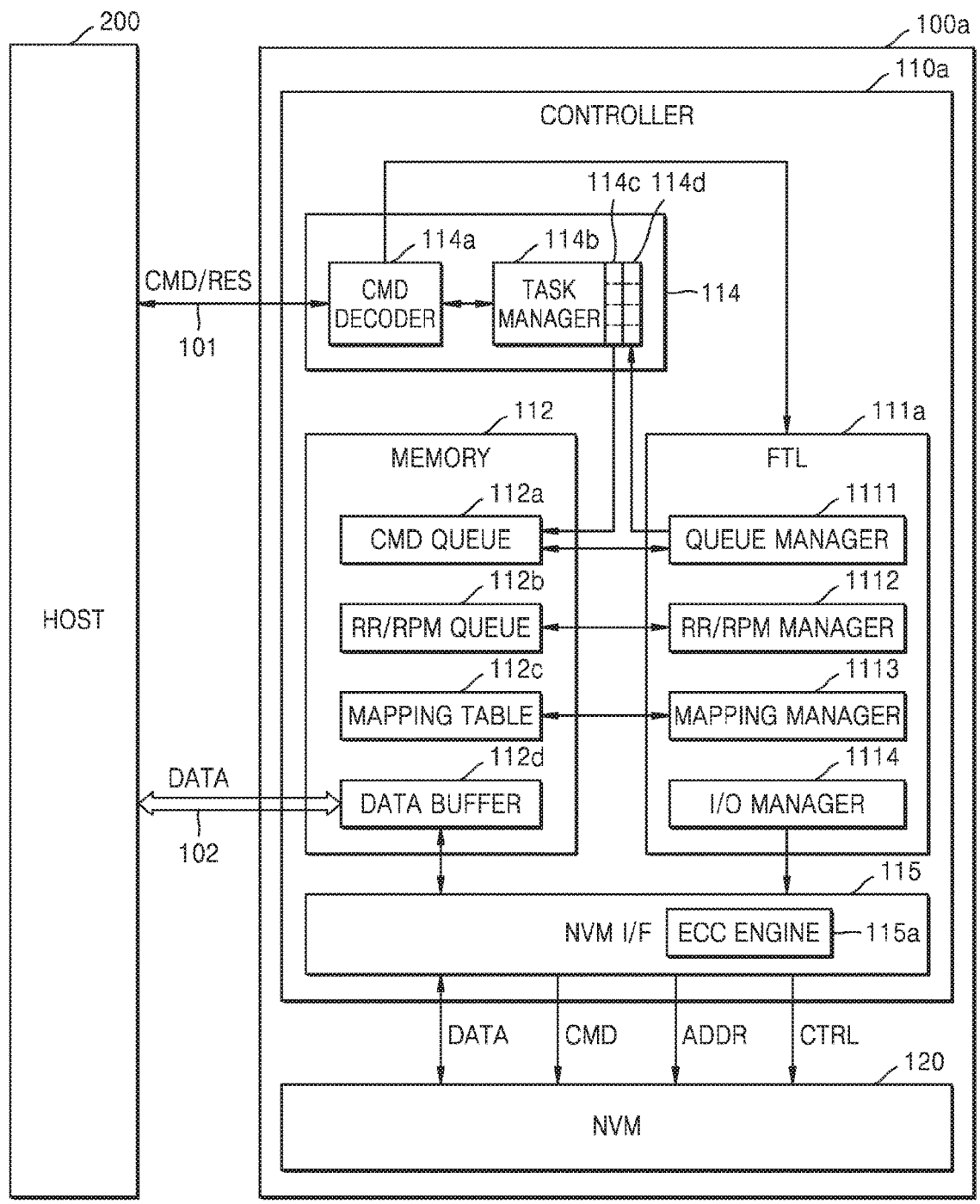
FIG. 4 is a block diagram of a storage device according to an exemplary embodiment of the inventive concept.

FIG. 4 is a block diagram of a storage device according to an exemplary embodiment of the inventive concept.

Referring to FIG. 4, a storage device 100a may include a controller 110a and the non-volatile memory 120, and the controller 110a may include a flash translation layer (FTL) 111a, the memory 112, the host interface 114, and the non-volatile memory interface 115. The storage device 100a may correspond to the storage device 100 of FIG. 1, and the controller 110a may correspond to the controller 110 of FIG. 2. Therefore, the descriptions described above with reference to FIGS. 1 and 2 may also be applied to the present exemplary embodiment. In the present exemplary embodiment, the storage device 100a may be an eMMC device. However, the inventive concept is not limited thereto.

The host interface 114 may include a command decoder 114a, a task manager 114b, a command register 114c, and a status register 114d. The command decoder 114a may decode the command CMD received from the host 200, and may transfer, to the task manager 114b, a part of the decoded command. In the present exemplary embodiment, when the decoded command correspond to task setting and address commands, the command decoder 114a may transfer the decoded command to the task manager 114b. When the decoded command is a task execution command, the command decoder 114a may transfer the decoded command to the FTL 111a.

The task manager 114b may receive the command CMD from the command decoder 114a, and may manage the command register 114c and the status register 114d, according to task identification (ID) units. The command register 114c may store commands in the task ID units, and the status register 114d stores statuses of tasks stored in the command register 114c. The task manager 114b manages a status of each of the tasks through the status register 114d and notifies the host 200 with information regarding a task that is ready to be executed, according to a request by the host 200 or regardless of a request by the host 200.

Figures 5, 6:
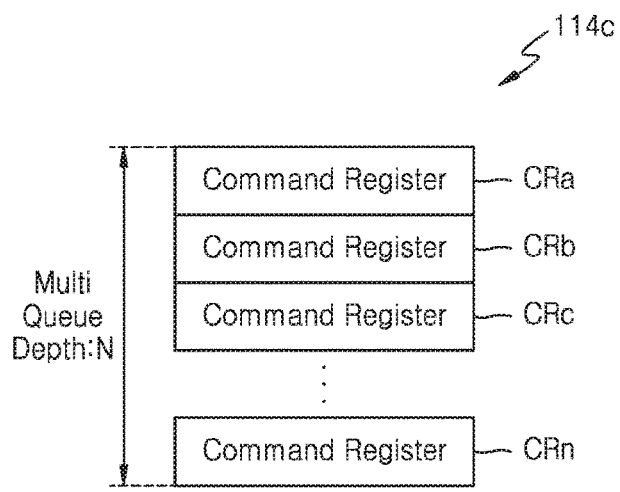
FIG. 5 is a block diagram of a command register of FIG. 4 according to an exemplary embodiment of the inventive concept.
FIG. 6 is a block diagram of a status register of FIG. 4 according to an exemplary embodiment of the inventive concept.

FIG. 5 is a block diagram of a command register of FIG. 4 according to an exemplary embodiment of the inventive concept.

Referring to FIGS. 4 and 5, the command register 114c may include first through $N^{th}$ command registers CRa through CRn. The first through $N^{th}$ command registers CRa through CRn may store first through $N^{th}$ tasks, respectively. Here, N refers to the number of command registers and is a natural number greater than or equal to 2. N may refer to a multi-queue depth, and the controller 110a may receive multi-queue commands corresponding to the multi-queue depth (e.g., N) from the host 200, and may store them in some of the first through $N^{th}$ command registers CRa through CRn. Each of the first through $N^{th}$ command registers CRa through CRn may store task information including a task ID, transmission direction information, a data size, a priority order, and a start address.

Commands received from the host 200 may be sequentially stored in the command register 114c. However, tasks are not executed according to a storing order, and the storage device 100a may determine an order of executing the tasks. For example, an execution order of a task may be changed according to a priority order included in the task information. According to the present exemplary embodiment, the execution order of the task may be changed according to the degradation information for a block to be accessed by the task. In an exemplary embodiment of the inventive concept, the storage device 100a may request the host 200 to execute a particular task, according to the determined order. According to an exemplary embodiment of the inventive concept, the storage device 100a may notify the host 200 that a particular task has a ready status, according to the determined order.

FIG. 6 is a block diagram of a status register of FIG. 4 according to an exemplary embodiment of the inventive concept.

Referring to FIGS. 4 through 6, the status register 114d may store statuses of the first through $N^{th}$ tasks stored in the first through $N^{th}$ command registers CRa through CRn, respectively. In more detail, the status register 114d may store status information of N bits indicating the statuses of the first through $N^{th}$ tasks. For example, a first bit (e.g., a least significant bit (LSB)) may indicate whether the first task is ready to be executed (hereinafter, referred to as a "ready status") or is not ready to be executed (hereinafter, referred to as a "not-ready status"). For example, an $N^{th}$ bit (e.g., a most significant bit (MSB)) may indicate whether the $N^{th}$ task is in the ready status or the not-ready status.

In the present exemplary embodiment, initial values of the first through $N^{th}$ tasks stored in the status register 114d may be all 0 (e.g., the not-ready status). When any one of the first through $N^{th}$ tasks becomes the ready status, a corresponding bit of the status register 114d may be changed to 1 (e.g., the ready status). In the present exemplary embodiment, when a queue manager 1111 of the FTL 111a determines a task selected from the command queue 112a to be the ready status, the queue manager 1111 may update a corresponding bit of the status register 114d. However, the inventive concept is not limited thereto, and for example, the task manager 114b may check a status of the task stored in the command register 114c, and may update the corresponding bit of the status register 114d.

Figure 7:
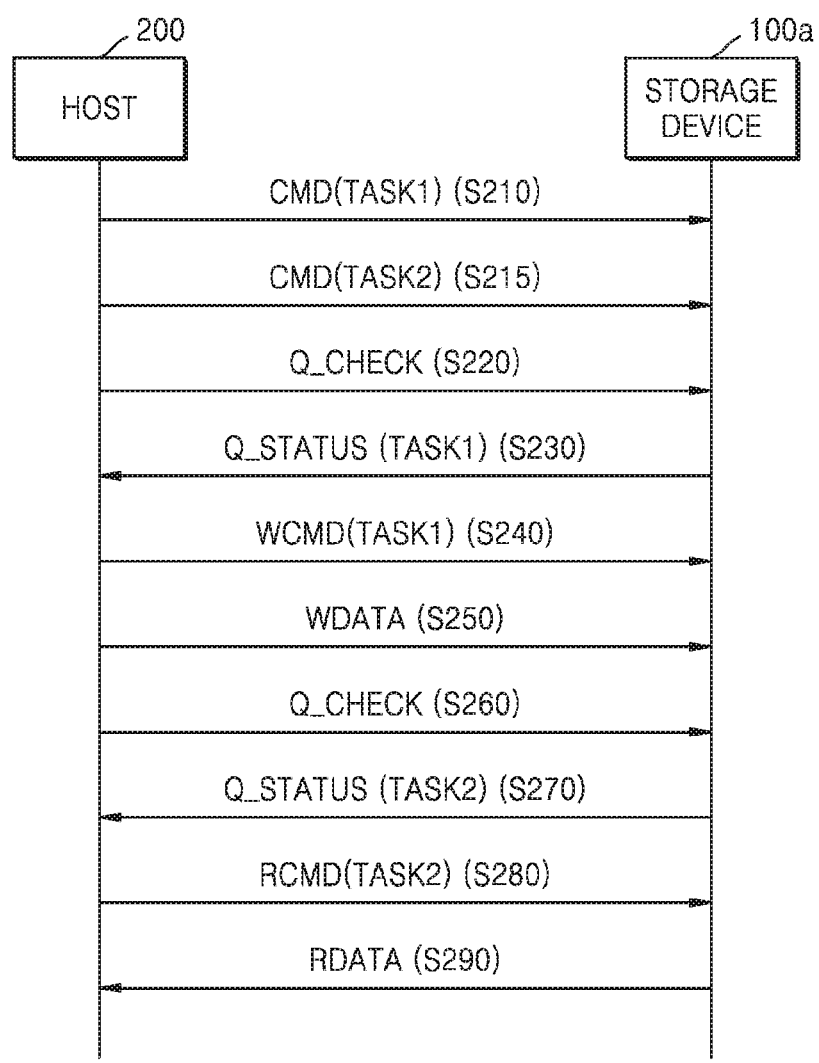
FIG. 7 is a flowchart illustrating operations between a host and the storage device of FIG. 4 according to an exemplary embodiment of the inventive concept.

FIG. 7 is a flowchart illustrating operations between a host and the storage device of FIG. 4 according to an exemplary embodiment of the inventive concept. Hereinafter, with reference to FIGS. 4 through 7, the operations between the host 200 and the storage device 100a will now be described.

In operation S210, the host 200 transmits task setting and address commands regarding a first task TASK1 to the storage device 100a. For example, the first task TASK1 may be a write task. While data of a previous task is transmitted through the data channels 102, the host 200 may transmit the task setting and address commands regarding the first task TASK1 to the storage device 100a. The command decoder 114a of the storage device 100a may transfer the task setting and address commands regarding the first task TASK1 to the task manager 114b, and the task manager 114b may store task information regarding the first task TASK1 in the command register 114c. For example, the task information regarding the first task TASK1 may be stored in the first command register CRa.

For example, the host 200 transmits a task setting command (e.g., CMD44 according to eMMC Electrical Standard 5.1) regarding the first task TASK1 to the storage device 100a, and then transmits a task address command (e.g., CMD45 according to eMMC Electrical Standard 5.1) regarding the first task TASK1 to the storage device 100a. However, the inventive concept is not limited thereto, and address information may be included in one command, e.g., the task setting command CMD44.

The task setting command (e.g., CMD44) is a command to set an ID of a task and an operation direction of the task, where the operation direction refers to a transmission direction of data. In more detail, the task setting command (e.g., CMD44) may include the ID of the task, operation direction information indicating the transmission direction of data, size information designating a size of data to be written to the non-volatile memory 120 or data to be read from the non-volatile memory 120, priority order information, or the like.

The task address command (e.g., CMD45) may include start address information of data of a corresponding task, and a start address may be a logical address. For example, when the task is a write task, the start address information may be information designating a start address of data to be written to the non-volatile memory 120. When the task is a read task, the start address information may be information designating a start address of data to be read from the non-volatile memory 120.

In operation S215, the host 200 transmits task setting and address commands regarding a second task TASK2 to the storage device 100a. For example, the second task TASK2 may be a read task. The command decoder 114a of the storage device 100a may transfer the task setting and address commands regarding the second task TASK2 to the task manager 114b, and the task manager 114b may store task information regarding the second task TASK2 in the command register 114c. For example, the task information regarding the second task TASK2 may be stored in the second command register CRb. In this manner, before the host 200 transmits data regarding the first task TASK1 to the storage device 100a or receives data regarding the first task TASK1 from the storage device 100a, the host 200 may transmit the task setting and address commands regarding the second task TASK2 to the storage device 100a.

In operation S220, the host 200 transmits, to the storage device 100a, a status check command Q_CHECK for checking the statuses stored in the status register 114d. The status check command Q_CHECK checks the ready status of each of the tasks stored in the command register 114c. For example, the status check command Q_CHECK may be a SEND_STATUS command CMD13 according to eMMC Electrical Standard 5.1.

In operation S230, the storage device 100a transmits a status respond message Q_STATUS to the host 200, in response to the status check command Q_CHECK. For example, the status respond message Q_STATUS may indicate that the first task TASK1 has the ready status.

In operation S240, the host 200 may transmit a write execution command WCMD with respect to the first task TASK1 to the storage device 100a.

In operation S250, the host 200 may transmit write data WDATA for the first task TASK1 to the storage device 100a. The storage device 100a may receive and store the write data WDATA in a data buffer 112d of the memory 112, and may program the stored write data WDATA to the non-volatile memory 120.

In operation S260, the host 200 transmits, to the storage device 100a, the status check command Q_CHECK for checking the statuses stored in the status register 114d. Operation S260 may be periodically or non-periodically performed.

In operation S270, the storage device 100a transmits the status respond message Q_STATUS to the host 200, in response to the status check command Q_CHECK. For example, the status respond message Q_STATUS may indicate that the second task TASK2 has the ready status.

In operation S280, the host 200 may transmit a read execution command RCMD for the second task TASK2 to the storage device 100a.

In operation S290, the storage device 100a may transmit read data RDATA for the second task TASK2 to the host 200. In more detail, the storage device 100a may read the read data RDATA from the non-volatile memory 120, may store the read data RDATA in the data buffer 112d, and may transmit the stored read data RDATA to the host 200.

Referring back to FIG. 4, the FTL 111a may include the queue manager 1111, a read reclaim/replacement (RR/RPM) manager 1112, a mapping manager 1113, and an input/output (I/O) manager 1114. In this manner, the scheduler 111 of FIG. 1 may be embodied in the FTL 111a. The command queue 112a, the RR/RPM queue 112b, and the mapping table 112c may be loaded to the memory 112, and the memory 112 may further include the data buffer 112d. In an exemplary embodiment of the inventive concept, the FTL 111a may be loaded to the memory 112 and may be executed by the processor 113 (refer to FIG. 2). According to an exemplary embodiment of the inventive concept, the FTL 111a may be loaded to a first memory chip, and the memory 112 may be a second memory chip.

The queue manager 1111 may store the tasks, which are stored in the command register 114c, in the command queue 112a of the memory 112. The queue manager 1111 may select one of the tasks queuing in the command queue 112a, and may determine whether the selected task is ready. In the present exemplary embodiment, the queue manager 1111 may determine whether the selected task is ready, based on the degradation information for a block to be accessed by the selected task. In addition, when the queue manager 1111 determines that the selected task has the ready status, the queue manager 1111 may update the status register 114d.

The RR/RPM manager 1112 may manage the RR/RPM queue 112b. In an exemplary embodiment of the inventive concept, the RR/RPM queue 112b may store information indicating a read reclaim target or a replacement target according to each block. In an exemplary embodiment of the inventive concept, the RR/RPM queue 112b may store information indicating a read reclaim target or a replacement target according to each block and page. Read reclaim and replacement operations will be described below with reference to FIG. 8.

The mapping manager 1113 may manage the mapping table 112c. The mapping table 112c may store mapping information regarding mapping between a logical address received from the host 200 and a physical address of the non-volatile memory 120. In an exemplary embodiment of the inventive concept, the non-volatile memory 120 may store a plurality of mapping tables, and when power is applied to the storage device 100a, some of the plurality of mapping tables stored in the non-volatile memory 120 may be loaded to the memory 112.

The I/O manager 1114 may issue a write command to be provided to the non-volatile memory 120, in response to a write task execution command (e.g., CMD47 according to eMMC Electrical Standard 5.1). In addition, the I/O manager 1114 may issue a read command to be provided to the non-volatile memory 120, in response to a read task execution command (e.g., CMD46 according to eMMC Electrical Standard 5.1). In this regard, the I/O manager 1114 may refer to the mapping table 112c and thus may obtain physical addresses corresponding to the write command and the read command.

The non-volatile memory interface 115 may be implemented as a flash interface layer (FIL). The non-volatile memory interface 115 may transmit the command CMD, an address ADDR, and a control signal CTRL to the non-volatile memory 120. Data DATA may be transmitted between the non-volatile memory interface 115 and the non-volatile memory 120 (e.g., in response to the write command and read command). In an exemplary embodiment of the inventive concept, the non-volatile memory interface 115 may include an error correction code (ECC) engine 115a. The ECC engine 115a may perform error detection and correction with respect to data read from the non-volatile memory 120. However, the inventive concept is not limited thereto, and the ECC engine 115a may not be included in the non-volatile memory interface 115 and may be embodied as a separate block.

Figure 8:
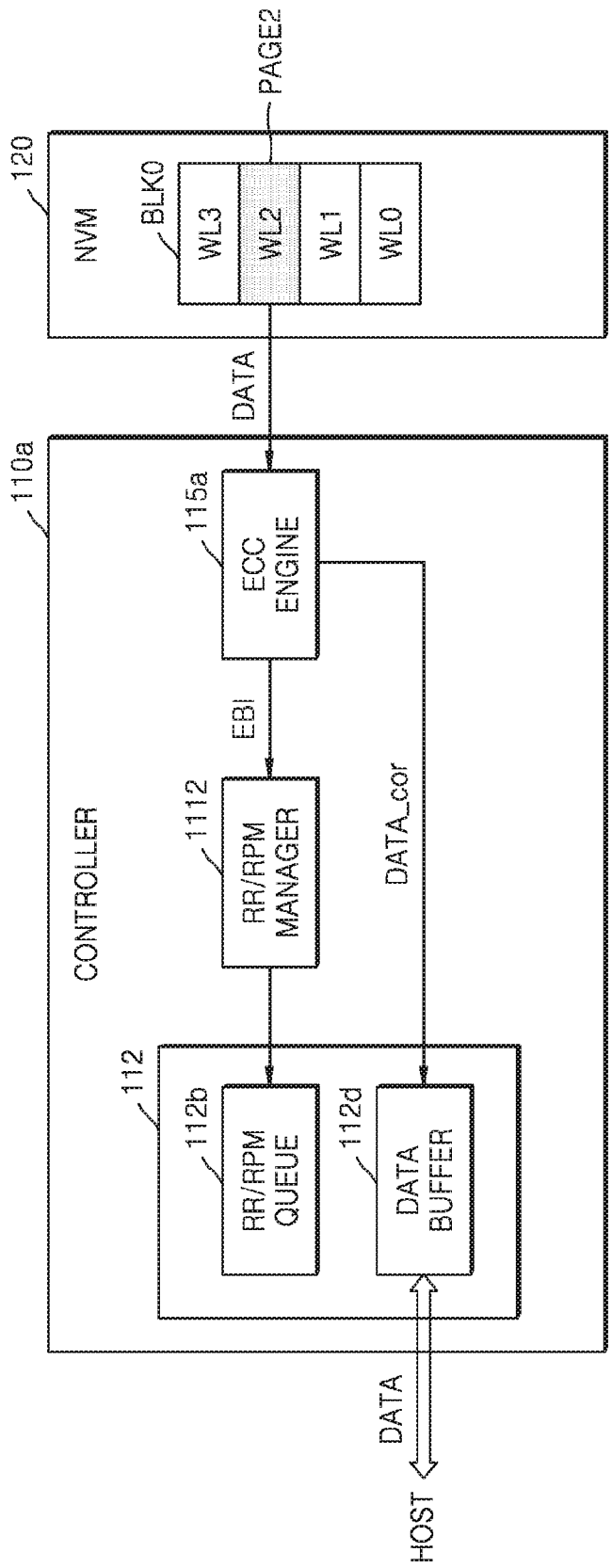
FIG. 8 illustrates a read reclaim operation according to an exemplary embodiment of the inventive concept.

FIG. 8 illustrates a read reclaim operation according to an exemplary embodiment of the inventive concept.

Referring to FIG. 8, the controller 110a may read data DATA from a third page PAGE2 corresponding to a third wordline WL2 of a first block BLK0 included in the non-volatile memory 120. The ECC engine 115a may detect an error bit of the data DATA, and may provide error bit information EBI regarding the detected error bit to the RR/RPM manager 1112. In addition, the ECC engine 115a may correct the error bit when the error bit is plural in number and the number of the error bits is less than a first reference value, and may provide error-corrected data DATA_cor to the data buffer 112d. When the number of the error bits is greater than or equal to the first reference value, the ECC engine 115a may determine that an uncorrectable error (UNCOR) has occurred. When a threshold voltage of memory cells is changed due to a read disturb phenomenon, the number of the error bits may be greater than or equal to the first reference value, so that the UNCOR may occur.

When the number of the error bits is greater than or equal to the first reference value, the RR/RPM manager 1112 may determine the first block BLK0 to be a replacement target. Additionally, when the number of the error bits is greater than or equal to the first reference value, the first block BLK0 may be a block in which the UNCOR has occurred. Here, "replacement" refers to an operation of transferring data stored in the first block BLK0 to a reserved block or a spare block, and using the reserved block to which the data has been transferred, instead of the first block BLK0. In more detail, valid pages stored in the first block BLK0 may be read, and the read valid pages may be programmed to the reserved block. Accordingly, a block address is not changed in a mapping table, but a page address may be changed according to the number of the valid pages in the first block BLK0.

When the number of the error bits is less than the first reference value and greater than or equal to a second reference value, the RR/RPM manager 1112 may determine the first block BLK0 to be a read reclaim target. In this regard, the second reference value may be a natural number less than the first reference value. Furthermore, when the number of the error bits is less than the first reference value and greater than or equal to the second reference value, the first block BLK0 may be a block in which the UNCOR did not occur but reliability of the block is decreased, and thus, correction is required. Here, "read reclaim" refers to an operation of transferring data of the first block BLK0 to another block, deleting the data from the first block BLK0, and reusing the first block BLK0. In more detail, valid pages stored in the first block BLK0 may be read, and the read valid pages may be programmed to a second block that is a different block. Accordingly, a block address in the mapping table is changed to the second block, and a page address may also be changed according to the number of the valid pages in the first block BLK0.

However, the inventive concept is not limited thereto, and according to exemplary embodiments of the inventive concept, the controller 110a may include a read reclaim manager, instead of the RR/RPM manager 1112, and the read reclaim manager may manage only a read reclaim operation according to the error bit information EBI. According to exemplary embodiments of the inventive concept, the controller 110a may include a replacement manager, instead of the RR/RPM manager 1112, and the replacement manager may manage only a replacement operation according to the error bit information EBI.

Because the read reclaim and replacement operations include a data transfer process, a data transfer time may be increased in accordance with the number of valid pages of a source block (e.g., the first block BLK0). When the valid pages stored in the first block BLK0 are transferred at one time, a response time with respect to a command issued during the data transfer may be increased. Instead, incremental read reclaim and replacement may be performed where each of the valid pages stored in the first block BLK0 are individually transferred. However, a plurality of read commands may be issued while the read reclaim and replacement operations are performed on the first block BLK0, and when at least one of the plurality of read commands is related to the first block BLK0, a read stress may be continuously applied to the first block BLK0, which may result in an UNCOR in the first block BLK0.

Figure 9A:
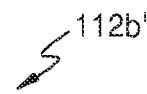
FIGS. 9A and 9B illustrate a read reclaim/replacement (RR/RPM) queue of FIG. 8 according to exemplary embodiments of the inventive concept.
Figure 9B:
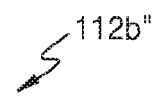

FIGS. 9A and 9B illustrate a RR/RPM QUEUE of FIG. 8 according to exemplary embodiments of the inventive concept.

Referring to FIG. 9A, a RR/RPM QUEUE 112b' may store information indicating a read reclaim target or a replacement target according to physical blocks. For example, the RR/RPM QUEUE 112b' may include a number of physical addresses PA and manage 2-bit information for each physical address PA (e.g., first through (N−1)-th blocks PBN0 through PBNn). In this regard, an LSB may indicate whether a corresponding block is a replacement target, and an MSB may indicate whether a corresponding block is a read reclaim target. For example, the 2-bit information corresponding to the first physical block PBN0 may be "10", so that the first physical block PBN0 may be a read reclaim target and may not be a replacement target.

Referring to FIG. 9B, a RR/RPM QUEUE 112b″ may store information indicating a read reclaim target or a replacement target according to the physical addresses PA including physical blocks BLK and pages WL (e.g., (0,0) through (n,m)). For example, the RR/RPM QUEUE 112b″ may manage 2-bit information for each page, and in this regard, an LSB may indicate whether replacement is to be performed, and an MSB may indicate whether read reclaim is to be performed. For example, the 2-bit information corresponding to a physical address (0, 0) indicating a first page of a first block may be "10", so that the first page of the first block may be a read reclaim target and may not be a replacement target.

However, the inventive concept is not limited to the examples shown in FIGS. 9A and 9B. For example, the controller 110a may include both a read reclaim queue and a replacement queue. Alternatively, the controller 110a may include only one of the read reclaim queue or the replacement queue. The read reclaim queue may store 1-bit information indicating whether a physical block or a page is a read reclaim target, and the replacement queue may store 1-bit information indicating whether the physical block or the page is a replacement target.

Figure 10:
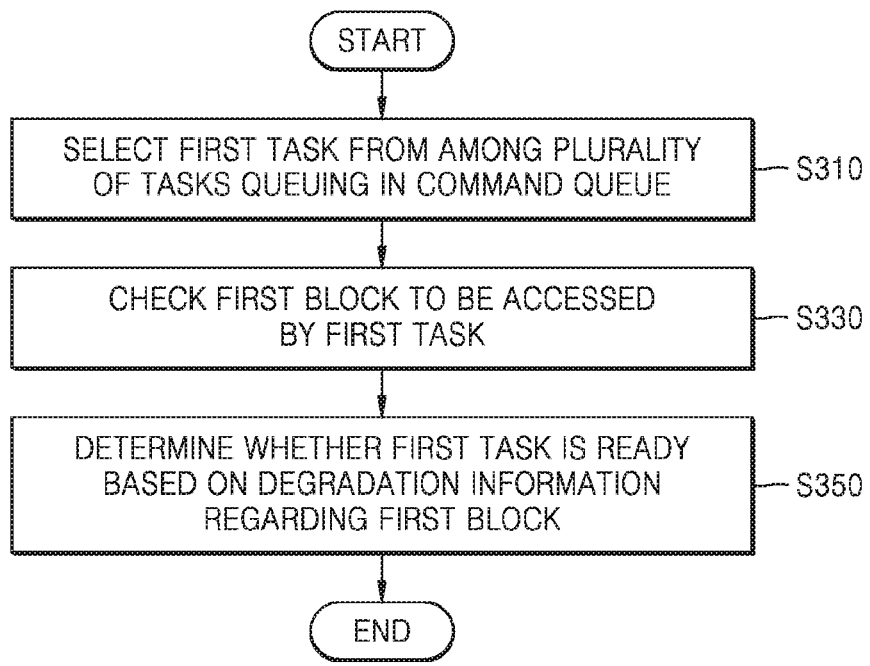
FIG. 10 is a flowchart of an operating method performed by a storage device according to an exemplary embodiment of the inventive concept.

FIG. 10 is a flowchart of an operating method performed by a storage device, according to an exemplary embodiment of the inventive concept.

Referring to FIG. 10, the operating method according to the present exemplary embodiment corresponds to a method of determining an order of executing tasks, where the method may be performed by the storage device 100a of FIG. 4 and may include operations that are performed in chronological order by the storage device 100a. The descriptions described above with reference to FIGS. 4 through 9B may also be applied to the present exemplary embodiment, and redundant descriptions thereof are not provided here.

In operation S310, a first task is selected from among a plurality of tasks queuing in a command queue. For example, the queue manager 1111 may select the first task from among a plurality of tasks queuing in the command queue 112a. In the present exemplary embodiment, the first task may be a read task. In more detail, the queue manager 1111 may select the first command, based on a priority order included in the task information, whether corresponding mapping information is included in the mapping table 112c, or the like.

In operation S330, a first block to be accessed by the first task is checked. For example, the queue manager 1111 may check a physical address mapped to a logical address to be accessed by the first task, by using the mapping table 112c. In an exemplary embodiment of the inventive concept, the physical address may include a physical block number so that the first block may be identified. In an exemplary embodiment of the inventive concept, the physical address may include the physical block number and a page number so that the first block and a first page may be identified.

In operation S350, it is determined whether the first task is ready based on the degradation information for the first block. For example, the queue manager 1111 may determine whether the first task is ready, by using the RR/RPM queue 112b. In more detail, when the first block is a read reclaim target or a replacement target, the queue manager 1111 may delay execution of the first task, and may select a second task. When the first block is neither the read reclaim target nor the replacement target, the queue manager 1111 may determine that the first task has the ready status, and may update the status register 114d.

Figure 11:
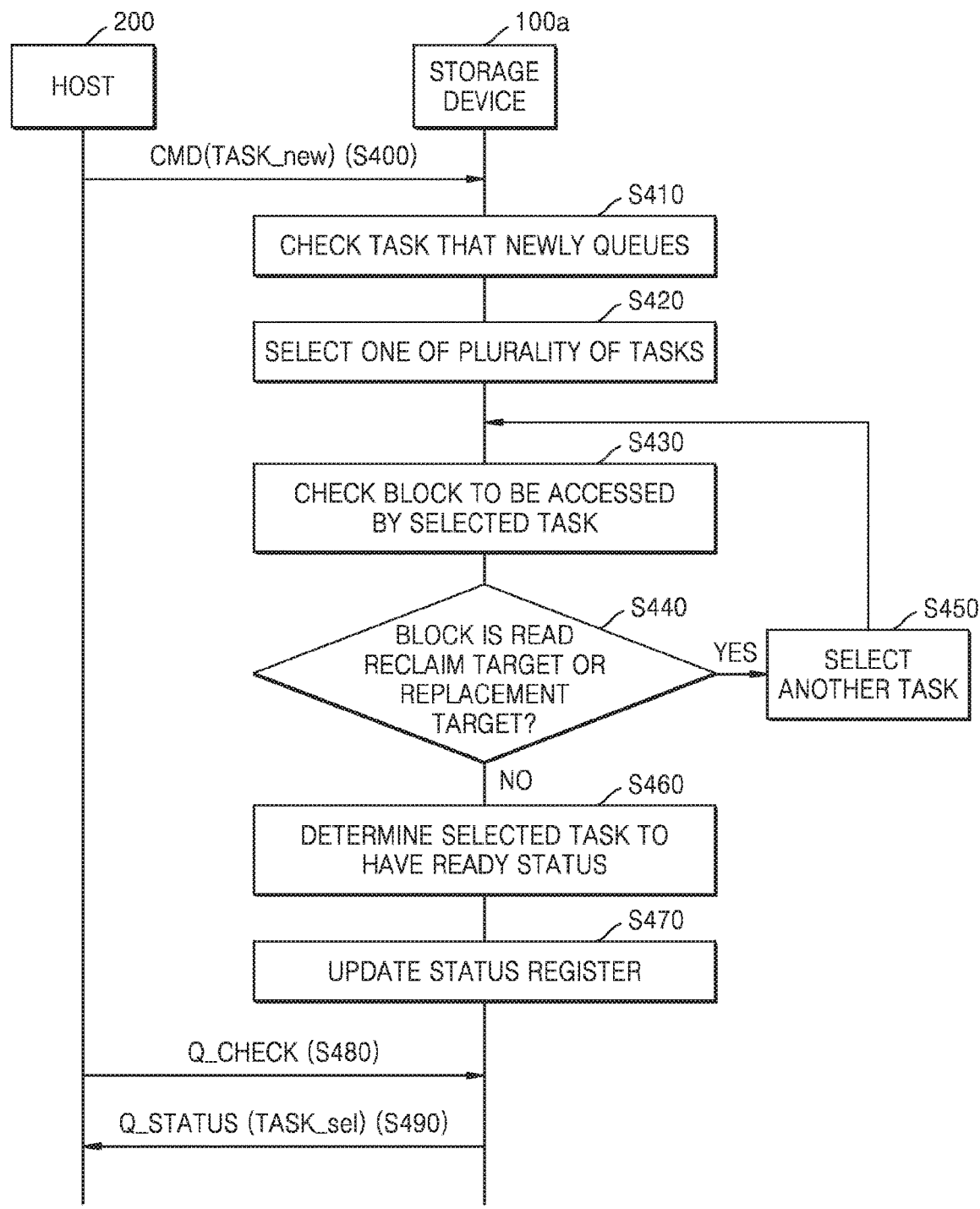
FIG. 11 is a flowchart of operations performed by the host and the storage device of FIG. 4 according to an exemplary embodiment of the inventive concept.

FIG. 11 is a flowchart of operations performed by the host and the storage device of FIG. 4 according to an exemplary embodiment of the inventive concept.

Referring to FIGS. 4 and 11, in operation S400, the host 200 transmits task setting and address commands regarding a new task TASK_new to the storage device 100a. The command decoder 114a of the storage device 100a may transfer the task setting and address commands regarding the new task TASK_new to the task manager 114b, and the task manager 114b may store task information regarding the new task TASK_new in the command register 114c.

In operation S410, the storage device 100a checks a task that newly queues. In more detail, the queue manager 1111 may check a task that newly queues in the command register 114c or a task that newly queues in the command queue 112a, e.g., the new task TASK_new. In operation S420, the storage device 100a selects one of a plurality of tasks. In more detail, the queue manager 1111 may select one of the plurality of tasks queuing in the command queue 112a or one of the plurality of tasks queuing in the command register 114c. In operation S430, the storage device 100a checks a block to be accessed by the selected task. In more detail, the queue manager 1111 may check a physical block to be accessed by the selected task, by using the mapping table 112c.

In operation S440, it is determined whether a block is a read reclaim target or a replacement target. In more detail, the queue manager 1111 may determine whether the block is the read reclaim target or the replacement target, by referring to the RR/RPM queue 112b. As a result of the determination, when the block is the read reclaim target or the replacement target, operation S450 is performed. In operation S450, another task is selected. In more detail, the queue manager 1111 may select another task from among the plurality of tasks queuing in the command queue 112a or the plurality of tasks queuing in the command register 114c, and may perform operation S430 again.

When the block is neither the read reclaim target nor the replacement target, operation S460 is performed. In operation S460, the selected task is determined to have the ready status. In operation S470, the status register 114d is updated. In more detail, the queue manager 1111 may determine the selected task to have the ready status, and may change a bit corresponding to the selected task from 0 to 1 in the status register 114d.

In operation S480, the host 200 transmits, to the storage device 100a, the status check command Q_CHECK for checking statuses stored in the status register 114d. Operation S480 does not have to be performed after operation S470. For example, operation S480 may be performed between operation S400 and operation S490. In operation S490, the storage device 100a transmits the status respond message Q_STATUS to the host 200, in response to the status check command Q_CHECK. For example, the status respond message Q_STATUS may indicate that a selected task TASK_sel has the ready status.

Figure 12:
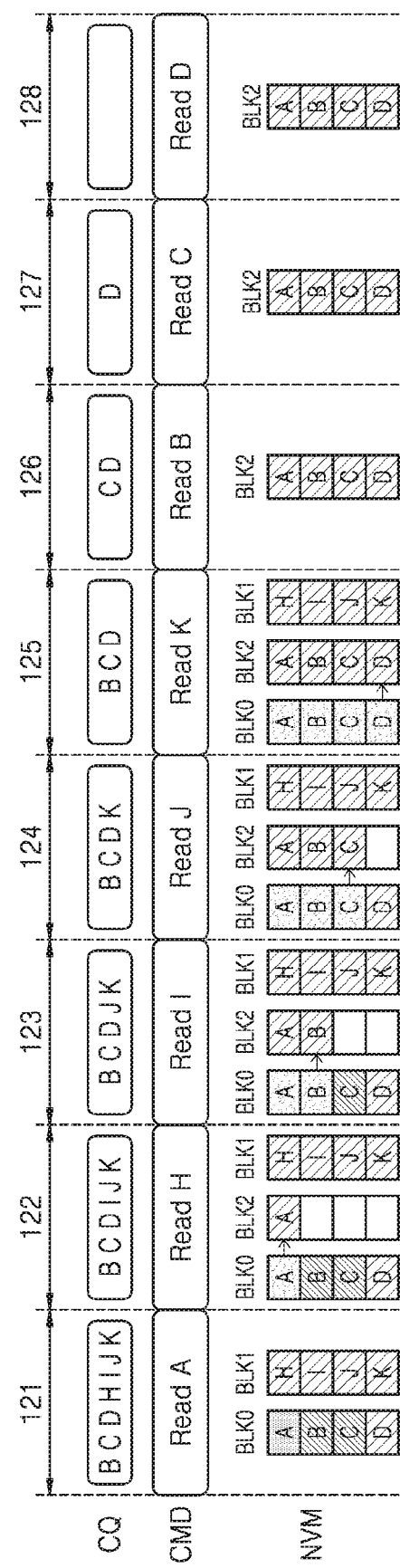
FIG. 12 illustrates operations performed by the storage device of FIG. 11 according to an exemplary embodiment of the inventive concept.

FIG. 12 illustrates operations performed by the storage device of FIG. 11 according to an exemplary embodiment of the inventive concept.

Referring to FIGS. 4, 11, and 12, the plurality of tasks queuing in a command queue CQ may be read tasks. For example, a task A through a task D may be tasks to access the first block BLK0 of a non-volatile memory NVM, and a task H through a task K may be tasks to access a second block BLK1 of the non-volatile memory NVM. However, the inventive concept is not limited thereto, and read tasks and write tasks may queue in the command queue CQ.

According to the present exemplary embodiment, the storage device 100a may select one of the plurality of tasks queuing in the command queue CQ, based on a block to be accessed by the task and degradation information regarding the block, and may determine the selected task to have the ready status.

The command CMD may be a command provided from the controller 110a of the storage device 100a to the non-volatile memory NVM. In more detail, the host 200 may transmit an execution command regarding a task having the ready status to the storage device 100a, and the controller 110a may provide the command CMD to the non-volatile memory NVM, in response to the execution command, so that the storage device 100a may execute the task. However, the inventive concept is not limited thereto, and the command CMD may be provided from the host 200 to the storage device 100a. Hereinafter, operations of a plurality of periods will be described.

During a first period 121, the task A from among the tasks queuing in the command queue CQ may be selected. The storage device 100a may determine the selected task A to have the ready status, and the host 200 may transmit an execution command regarding the task A to the storage device 100a. The storage device 100a may perform a read operation with respect to the task A, in response to the execution command regarding the task A.

As a result of performing the read operation with respect to the task A, a read reclaim may occur in a page A. In this regard, a page B and a page C that are adjacent to the page A may also have a read stress. Therefore, the first block BLK0 may become a read reclaim target, and an incremental read reclaim may be performed to sequentially transfer valid pages included in the first block BLK0 to a third block BLK2 that is a free block. Since the first block BLK0 includes four valid pages (e.g., the page A through a page D), the incremental read reclaim with respect to the first block BLK0 may be performed during second through fifth periods 122 through 125.

While the page A is being transferred from the first block BLK0 to the third block BLK2 during the second period 122, if a task B is selected and thus a read operation with respect to the page B is performed, the page D may also have a read stress. Afterward, while the page B is being transferred from the first block BLK0 to the third block BLK2 during the third period 123, if a task C is selected and thus a read operation with respect to the page C is performed, a read reclaim may occur in the page C and the page D. Afterward, while the page C is being transferred from the first block BLK0 to the third block BLK2 during the fourth period 124, if a task D is selected and thus a read operation with respect to the page D is performed, an UNCOR may occur in the page D before the page D is transferred to the third block BLK2.

Therefore, according to the present exemplary embodiment, when the read reclaim occurs in the page A, the storage device 100a may determine the first block BLK0 including the page A to be a read reclaim target or a replacement target, and may update the RR/RPM queue 112b. According to the present exemplary embodiment, the storage device 100a may update the status register 114d in such a manner that an execution order of tasks is changed. For example, a task to access a block that is a read reclaim target or a replacement target may be delayed, and a task to access another block that is neither a read reclaim target nor a replacement target may be first executed. Therefore, to delay the task B through the task D that access the first block BLK0 and to first execute the task H through the task K that access the second block BLK1, the task H through the task K may be first determined to each have the ready status.

According to the present exemplary embodiment, during the second period 122, the task H may be selected from among the tasks queuing in the command queue CQ. Since the second block BLK1 to be accessed by the task H is not a read reclaim target, the storage device 100a may determine the selected task H to have the ready status, and the host 200 may transmit an execution command for the task H to the storage device 100a. The storage device 100a may perform a read operation with respect to a page H, in response to the execution command for the task H. Accordingly, during the second period 122, the page A may be transferred from the first block BLK0 to the third block BLK2, and the page H may be read. Hereinafter, with reference to FIGS. 13 and 14, operations by the storage device 100a during the second period 122 will be described.

Figure 13:
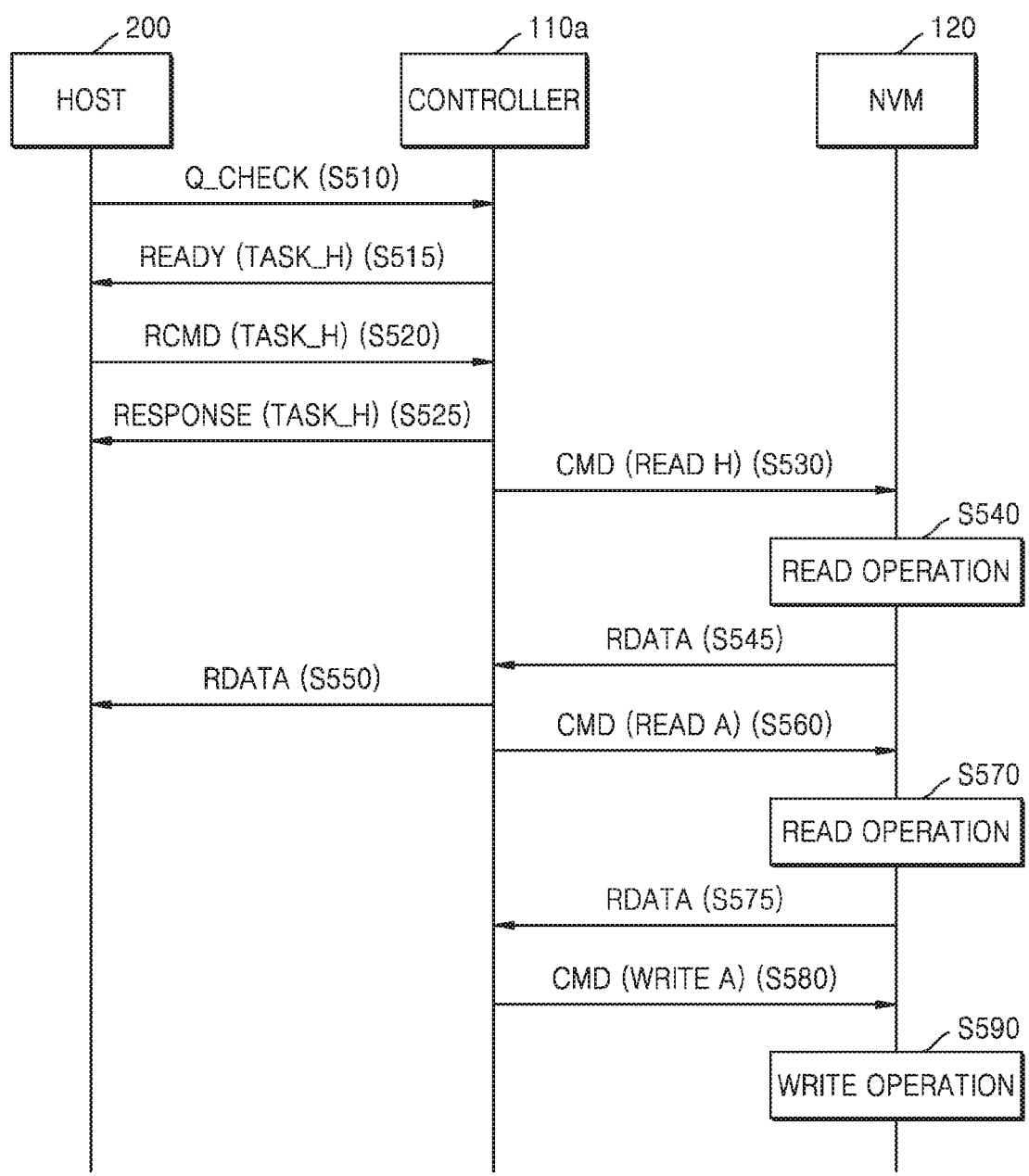
FIG. 13 is a flowchart of operations performed by the host, a controller, and a non-volatile memory of FIG. 4 during a second period of FIG. 12, according to an exemplary embodiment of the inventive concept.

FIG. 13 is a flowchart of operations performed by the host, a controller, and a non-volatile memory of FIG. 4 during a second period of FIG. 12, according to an exemplary embodiment of the inventive concept. Hereinafter, descriptions will now be provided with reference to FIGS. 4 and 11 through 13.

In operation S510, the host 200 transmits the status check command Q_CHECK to the controller 110a. In an exemplary embodiment of the inventive concept, operation S510 may be performed before the second period 122 starts. In operation S515, the controller 110a transmits, to the host 200, a ready signal READY indicating that the task H has the ready status or a status response message. In more detail, the queue manager 111l may determine the task H to have the ready status, and may update the status register 114d. The task manager 114b may check an updated state of the status register 114d, and may provide the status response message indicating that the task H has the ready status. In operation S520, the host 200 transmits, to the controller 110a, a read task execution command RCMD with respect to the task H. In operation S525, the controller 110a transmits a response message RESPONSE to the host 200.

In operation S530, the controller 110a transmits a read command (e.g., the command CMD) regarding the page H to the non-volatile memory 120. In more detail, the I/O manager 1114 may issue the read command regarding the page H, in response to the read task execution command RCMD. In operation S540, the non-volatile memory 120 performs a read operation with respect to the page H. In operation S545, the non-volatile memory 120 transmits read data RDATA to the controller 110a. The ECC engine 115a may perform error detection and correction with respect to the read data RDATA, and may provide the read data RDATA or corrected data to the data buffer 112d. In operation S550, the controller 110a transmits the read data RDATA to the host 200.

In operations S560 through S590, a read reclaim operation with respect to the page A is performed. In this regard, the read reclaim operation may be performed as a background operation. In an exemplary embodiment of the inventive concept, operations S560 through S590 may be first performed, and then operations S530 through S550 may be performed. In an exemplary embodiment of the inventive concept, operations S560 through S575 may be first performed, operations S530 through S545 may be performed, and then operations S580 and S590 may be performed.

Figure 14:
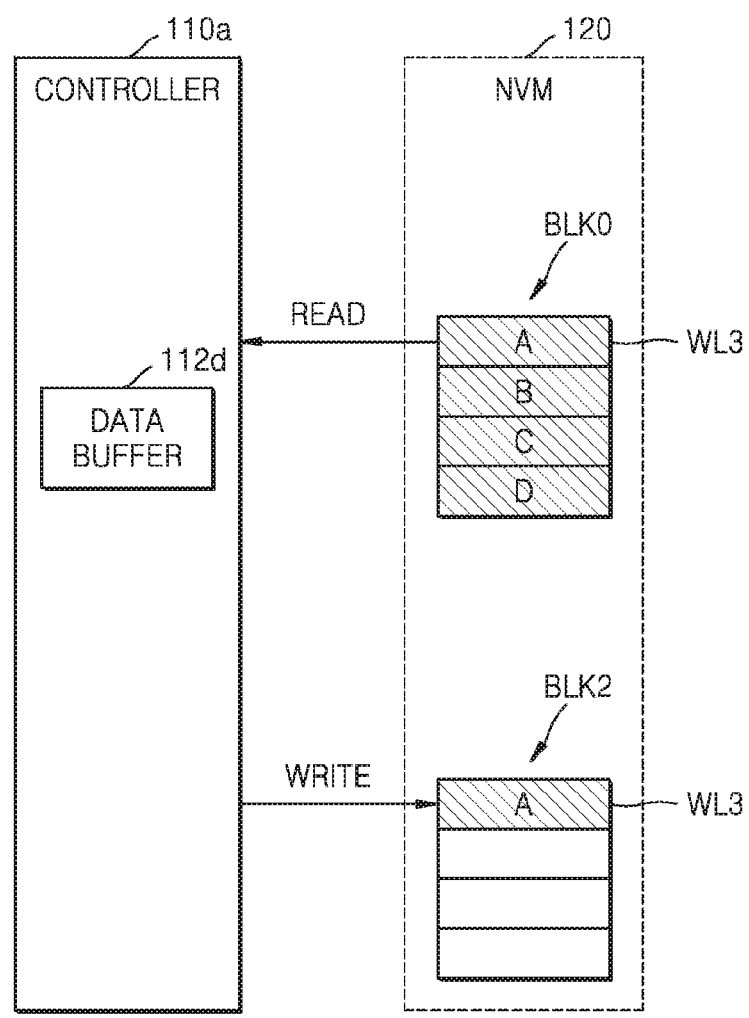
FIG. 14 illustrates a read reclaim operation of FIG. 13 according to an exemplary embodiment of the inventive concept.

FIG. 14 illustrates a read reclaim operation of FIG. 13 according to an exemplary embodiment of the inventive concept. Hereinafter, with reference to FIGS. 13 and 14, operations S560 through S590 will be described.

In operation S560, the controller 110a transmits a read command (e.g., the command CMD) regarding the page A. A physical address for reading the page A may be a fourth wordline WL3 of the first block BLK0. In this regard, the controller 110a may transmit the physical address of the page A to the non-volatile memory 120. In operation S570, the non-volatile memory 120 performs a data read operation on the fourth wordline WL3 of the first block BLK0. In operation S575, the non-volatile memory 120 transmits read data RDATA to the controller 110a. In this regard, the read data RDATA may be stored in the data buffer 112d of the controller 110a.

In operation S580, the controller 110a transmits a write command (e.g., the command CMD) regarding the page A. A physical address for a write operation on the page A may be a fourth wordline WL3 of the third block BLK2. In this regard, the controller 110a may transmit the physical address of the page A and the data stored in the data buffer 112d to the non-volatile memory 120. In operation S590, the non-volatile memory 120 writes the data on the fourth wordline WL3 of the third block BLK2 by performing a data write operation.

Referring back to FIG. 12, during the third period 123, the task I may be selected from among the tasks queuing in the command queue CQ, so that the page B may be transferred from the first block BLK0 to the third block BLK2, and a page I may be read during the third period 123. During the fourth period 124, the task J may be selected from among the tasks queuing in the command queue CQ, so that the page C may be transferred from the first block BLK0 to the third block BLK2, and a page J may be read during the fourth period 124. During the fifth period 125, the task K may be selected from among the tasks queuing in the command queue CQ, so that the page D may be transferred from the first block BLK0 to the third block BLK2, and a page K may be read during the fifth period 125.

When the incremental read reclaim with respect to the first block BLK0 is completed during the second through fifth periods 122 through 125, the mapping table 112c may be updated. In more detail, in the mapping table 112c, a physical address of a block to be accessed by the task B through the task D may be changed to that of the third block BLK2. During sixth through eighth periods 126 through 128, the task B through the task D may be sequentially selected, so that the page B through the page D of the third block BLK2 may be sequentially read.

In this manner, according to the present exemplary embodiment, since an order of executing tasks to access the first block BLK0 is delayed during a read reclaim for the first block BLK0, a read operation may not be performed on the first block BLK0. Accordingly, a read stress may no longer be applied to pages included in the first block BLK0, thus preventing an UNCOR. As a result, reliability of the storage device 100a may be increased.

Figure 15:
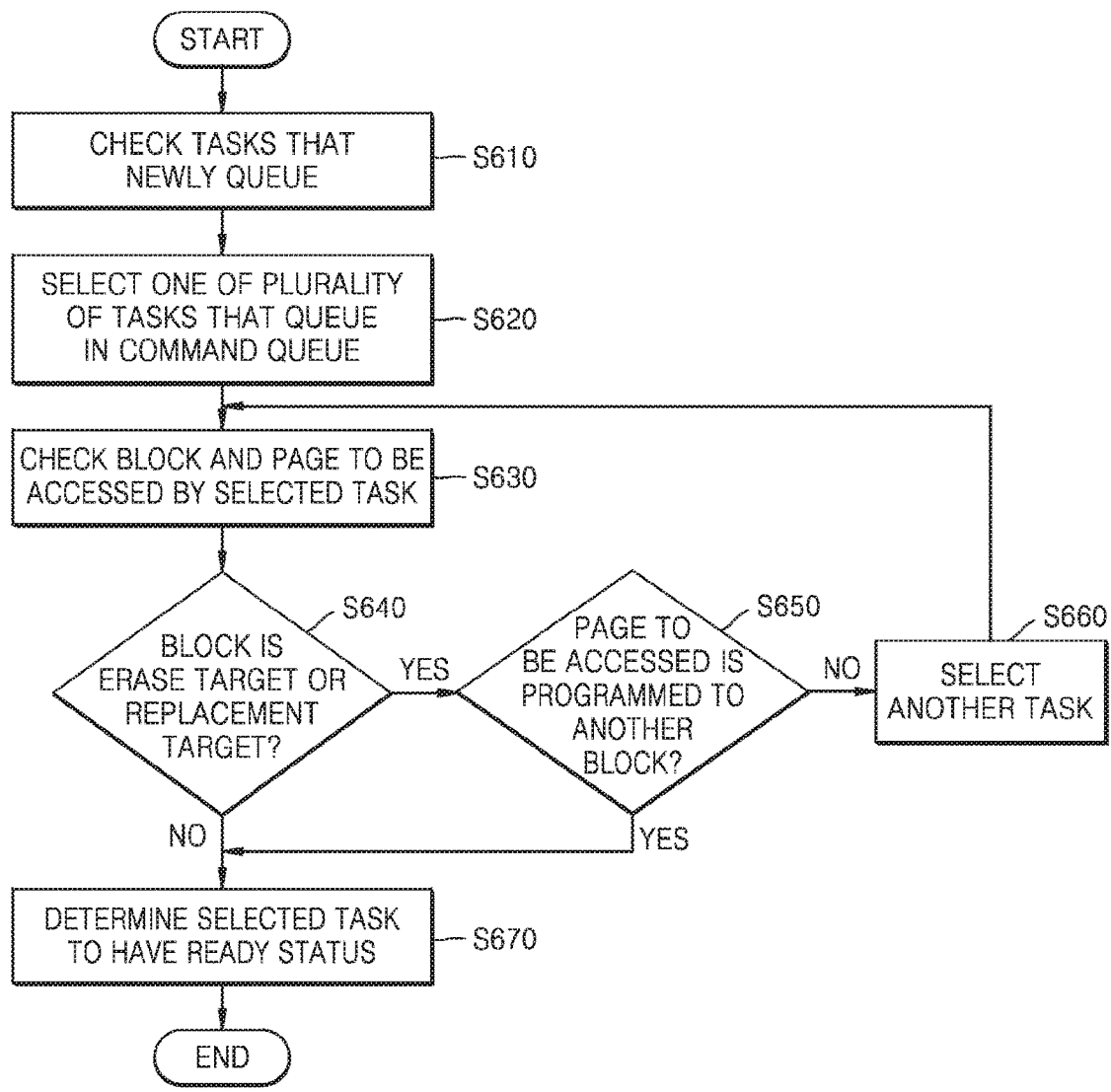
FIG. 15 illustrates an operating method performed by a storage device according to an exemplary embodiment of the inventive concept.

FIG. 15 illustrates an operating method performed by a storage device according to an exemplary embodiment of the inventive concept.

Referring to FIG. 15, the operating method according to the present exemplary embodiment corresponds to a method of determining an order of executing tasks, which may include operations that are performed in chronological order by the storage device 100a. The present exemplary embodiment may correspond to the operating method described with reference to FIG. 11. The descriptions described above with reference to FIGS. 11 through 14 may also be applied to the present exemplary embodiment, and redundant descriptions thereof are not provided here.

In operation S610, tasks that newly queue are checked. For example, the queue manager 1111 may check tasks that newly queue in the command register 114c or tasks that newly queue in the command queue 112a. In operation S620, one of the tasks that newly queue in the command queue 112a is selected. For example, the queue manager 1111 may select one of the tasks queuing in the command queue 112a or one of the tasks stored in the command register 114c. In operation S630, a block and page to be accessed by the selected task are checked. For example, the queue manager 1111 may check a physical block and physical page to be accessed by the selected task, by referring to the mapping table 112c.

In operation S640, it is determined whether the block is an erase target or a replacement target. The queue manager 1111 may determine whether the block is the erase target or the replacement target, by referring to the RR/RPM queue 112b. As a result of the determination, when the block is the erase target or the replacement target (operation S640: YES), operation S650 is performed. When the block is neither the erase target nor the replacement target (operation S640: NO), operation S670 is performed.

In operation S650, it is determined whether the page to be accessed is programmed to another block. As a result of the determination, when the page to be accessed is already programmed to another block (operation S650: YES), operation S670 is performed. In operation S670, the selected task is determined to have the ready status. For example, the queue manager 1111 may determine the selected task to have the ready status, and may update a bit corresponding to the selected task from 0 to 1 in the status register 114d.

When the page to be accessed is not yet programmed to another block (operation S650: NO), operation S660 is performed. In operation S660, another task is selected. For example, the queue manager 1111 may select another task from among the tasks queuing in the command queue 112a and the tasks stored in the command register 114c, and may perform operation S630 again.

According to the present exemplary embodiment, when the page to be accessed by the task selected from the command queue 112a has been already programmed to another block, the selected task may be determined to have the ready status. Accordingly, it is possible to prevent execution of a previously-queuing task from being significantly delayed, so that an operational function of the storage device 100a may be enhanced.

Figure 16:
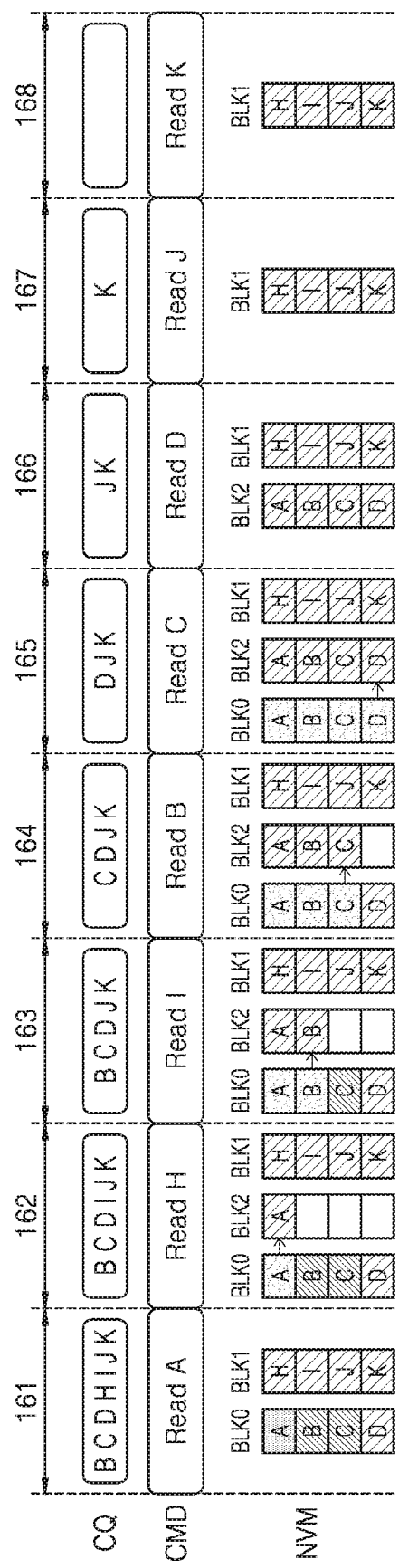
FIG. 16 illustrates operations performed by the storage device of FIG. 4 in the operating method of FIG. 15 according to an exemplary embodiment of the inventive concept.

FIG. 16 illustrates operations performed by the storage device of FIG. 4 in the operating method of FIG. 15 according to an exemplary embodiment of the inventive concept. Hereinafter, descriptions will be provided with reference to FIGS. 4, 15, and 16. FIG. 16 is similar to FIG. 12, and thus, redundant descriptions thereof are not provided here.

During a first period 161, the task A from among the plurality of tasks queuing in the command queue CQ may be selected, and a read operation with respect to the page A corresponding to the task A may be performed. As a result of performing the read operation with respect to the page A, a read reclaim may occur in the page A. Therefore, the first block BLK0 becomes a read reclaim target, so that an incremental read reclaim has to be performed to sequentially move valid pages included in the first block BLK0 to the third block BLK2 that is a free block. Since the first block BLK0 includes four valid pages (e.g., the page A through the page D), the incremental read reclaim with respect to the first block BLK0 may be performed during second through fifth periods 162 through 165.

According to the present exemplary embodiment, during the second period 162, the task H may be selected from among the tasks queuing in the command queue CQ. Accordingly, the page A may be transferred from the first block BLK0 to the third block BLK2 and the page H may be read, and in this regard, a read stress may not be applied to the pages included in the first block BLK0. Then, during the third period 163, the task I from among the tasks queuing in the command queue CQ may be selected. Accordingly, during the third period 163, the page B may be transferred from the first block BLK0 to the third block BLK2 and the page I may be read, and in this regard, a read stress may not be applied to the pages included in the first block BLK0.

Since the page B is transferred to the third block BLK2, a physical address corresponding to the page B in the mapping table 112c may be changed to a third wordline (e.g., WL2) of the third block BLK2. In this manner, since the page B is programmed to the third block BLK2, the page B may be no longer included in the first block BLK0 that is an erase target block or a replacement target block. Therefore, according to the present exemplary embodiment, during the fourth period 164, the task B may be selected from among the tasks queuing in the command queue CQ. Accordingly, during the fourth period 164, the page C may be transferred from the first block BLK0 to the third block BLK2 and the page B may be read from the third block BLK2, and in this regard, a read stress may not be applied to the pages included in the first block BLK0.

Since the page C is transferred to the third block BLK2, a physical address corresponding to the page C in the mapping table 112c may be changed to a second wordline (e.g., WL1) of the third block BLK2. In this manner, since the page C is programmed to the third block BLK2, the page C may be no longer included in the first block BLK0 that is the erase target block or the replacement target block. Therefore, according to the present exemplary embodiment, during the fifth period 165, the task C may be selected from among the tasks queuing in the command queue CQ. Accordingly, during the fifth period 165, the page D may be transferred from the first block BLK0 to the third block BLK2, and the page C may be read from the third block BLK2, and in this regard, a read stress may not be applied to the pages included in the first block BLK0.

In addition, since the page D is transferred to the third block BLK2, a physical address corresponding to the page D in the mapping table 112c may be changed to a first wordline (e.g., WL0) of the third block BLK2. In this manner, since the page D is programmed to the third block BLK2, the page D may be no longer included in the first block BLK0 that is the erase target block or the replacement target block. Therefore, according to the present exemplary embodiment, during a sixth period 166, the task D may be selected from among the tasks queuing in the command queue CQ, so that, during the sixth period 166, the page D may be read from the third block BLK2.

Afterward, during seventh and eighth periods 167 and 168, the task J and the task K may be sequentially selected from among the tasks queuing in the command queue CQ, so that, the page J and the page K may be sequentially read from a second block BLK1.

In this manner, according to the present exemplary embodiment, the storage device 100a may check a physical block and a page number to be accessed by a task, and even if the physical block is an erase target or a replacement target, if a corresponding page has been already transferred to a different block, the storage device 100a may determine the selected task to have the ready status. In more detail, according to the present exemplary embodiment, a time of executing the task B, the task C, and the task D may be faster than that of FIG. 12. Therefore, it is possible to prevent the ready status of a selected task from being delayed, and a response time with respect to the host 200 may be decreased.

Figure 17:
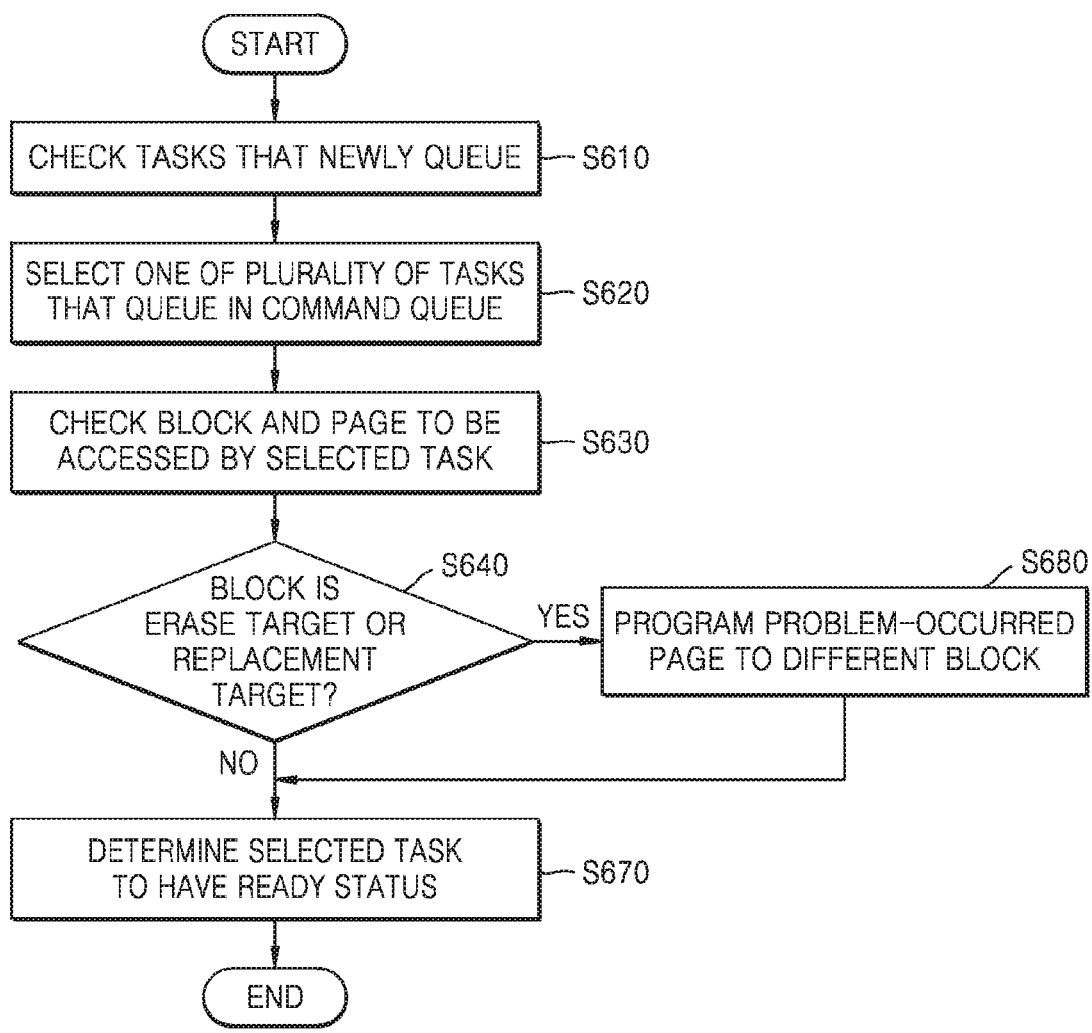
FIG. 17 illustrates an operating method performed by a storage device according to an exemplary embodiment of the inventive concept.

FIG. 17 illustrates an operating method performed by a storage device according to an exemplary embodiment of the inventive concept.

Referring to FIG. 17, the operating method according to the present exemplary embodiment may be similar to the operating method of FIG. 15, and the descriptions described above with reference to FIGS. 15 and 16 may also be applied to the present exemplary embodiment. In operation S610, the plurality of tasks that newly queue are checked. In operation S620, one of the plurality of tasks queuing in a command queue is selected. In operation S630, a block and page to be accessed by the selected task are checked. In operation S640, it is determined whether the block is an erase target or a replacement target.

As a result of the determination, when the block is the erase target or the replacement target (operation S640:YES), operation S680 is performed. In operation S680, a problem-occurred page is programmed to a different block. The problem-occurred page indicates a page where a read reclaim has occurred. When the block is neither the erase target nor the replacement target (operation S640:NO), operation S670 is performed. In operation S670, the selected task is determined to have the ready status.

According to the present exemplary embodiment, even if a task selected from the command queue 112a is an erase target or a replacement target, a page where a read reclaim has occurred may be first transferred to a different block, and then the selected task may be determined to have the ready status. Accordingly, it is possible to prevent execution of a previously-queuing task from being significantly delayed, so that an operational function of the storage device 100a may be enhanced.

Figure 18A:
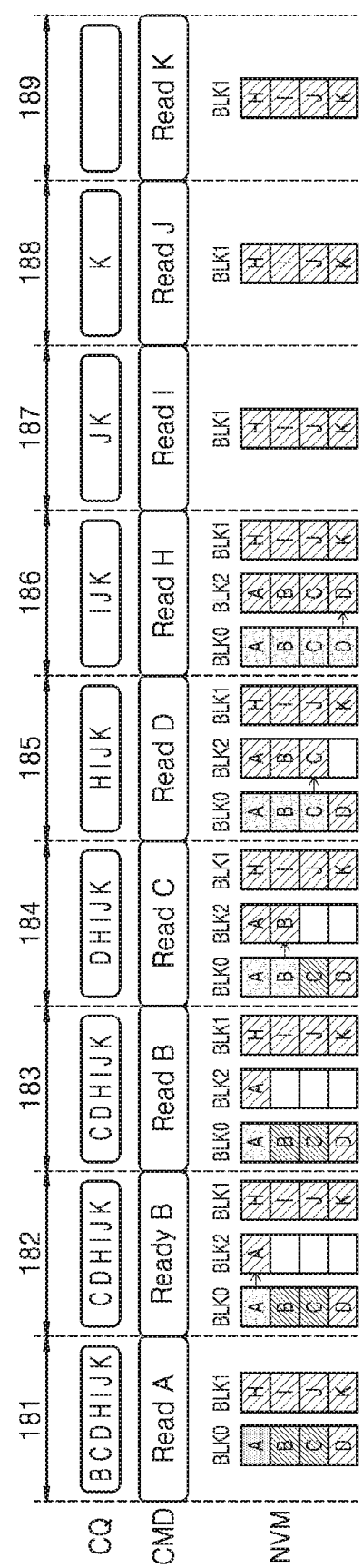
FIGS. 18A and 18B illustrate operations performed by the storage device of FIG. 4 in the operating method of FIG. 17 according to an exemplary embodiment of the inventive concept.
Figure 18B:
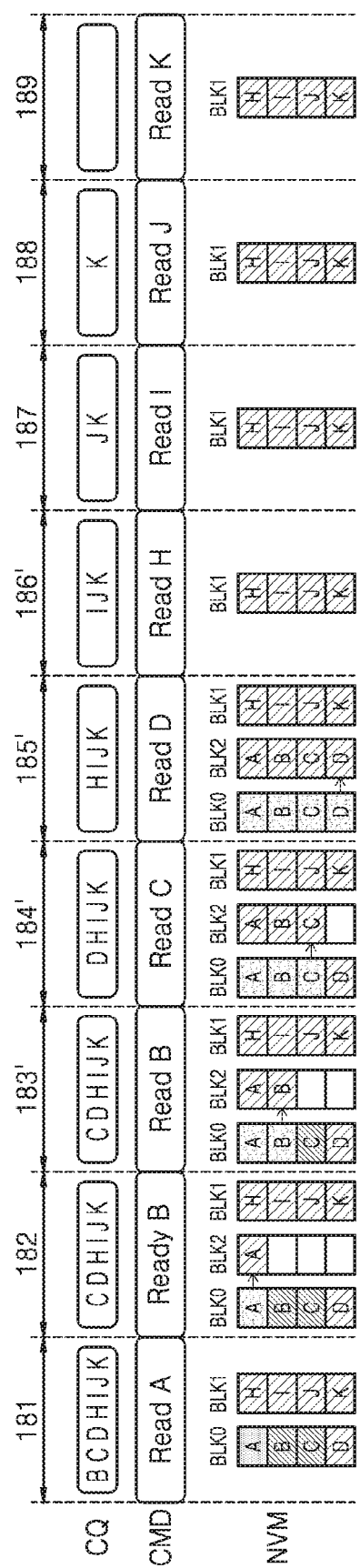

FIGS. 18A and 18B illustrate operations performed by the storage device of FIG. 4 in the operating method of FIG. 17 according to an exemplary embodiment of the inventive concept. Hereinafter, descriptions will now be provided with reference to FIGS. 4, 17, 18A, and 18B. FIGS. 18A and 18B are similar to FIG. 16, and thus, redundant descriptions thereof are not provided here.

Referring to FIG. 18A, during a first period 181, the task A may be selected from among the plurality of tasks queuing in the command queue CQ. As a result of performing a read operation on the page A, a read reclaim may occur in the page A. In this regard, a read stress may have been applied to a page B and a page C that are near the page A. Therefore, the first block BLK0 becomes a read reclaim target.

According to the present exemplary embodiment, during a second period 182, a problem-occurred page (e.g., the page A) where the read reclaim has occurred is first transferred from the first block BLK0 to the third block BLK2. In this regard, the storage device 100a may select the task B from among the tasks queuing in the command queue CQ, and may determine the task B to have the ready status. During a third period 183, the storage device 100a may perform a read operation on the page B corresponding to the task B.

During a fourth period 184, the storage device 100a may select the task C and may perform a read operation on the page C corresponding to the task C. In addition, the storage device 100a may transfer the page B from the first block BLK0 to the third block BLK2. During a fifth period 185, the storage device 100a may select the task D and may perform a read operation on the page D corresponding to the task D. In addition, the storage device 100a may transfer the page C from the first block BLK0 to the third block BLK2. During a sixth period 186, the storage device 100a may select the task H and may perform a read operation on the page H corresponding to the task H. In addition, the storage device 100a may transfer the page D from the first block BLK0 to the third block BLK2. Then, during seventh through ninth periods 187 through 189, the storage device 100a may sequentially select the task I through the task K, and may sequentially perform read operations on the page I through the page K.

Referring to FIG. 18B, the present exemplary embodiment may similar to FIG. 18A, except for third through sixth periods 183' through 186'. According to the present exemplary embodiment, in the third period 183', the storage device 100a may transfer the page B from the first block BLK0 to the third block BLK2, and then may read the page B from the third block BLK2. Afterward, during the fourth period 184', the storage device 100a may transfer the page C from the first block BLK0 to the third block BLK2, and then may read the page C from the third block BLK2. Afterward, during the fifth period 185', the storage device 100a may transfer the page D from the first block BLK0 to the third block BLK2, and then may read the page D from the third block BLK2. Afterward, during the sixth through ninth periods 186' through 189, the storage device 100a may sequentially select the task H through the task K, and then may sequentially perform read operations on the page H through the page K.

Figure 19:
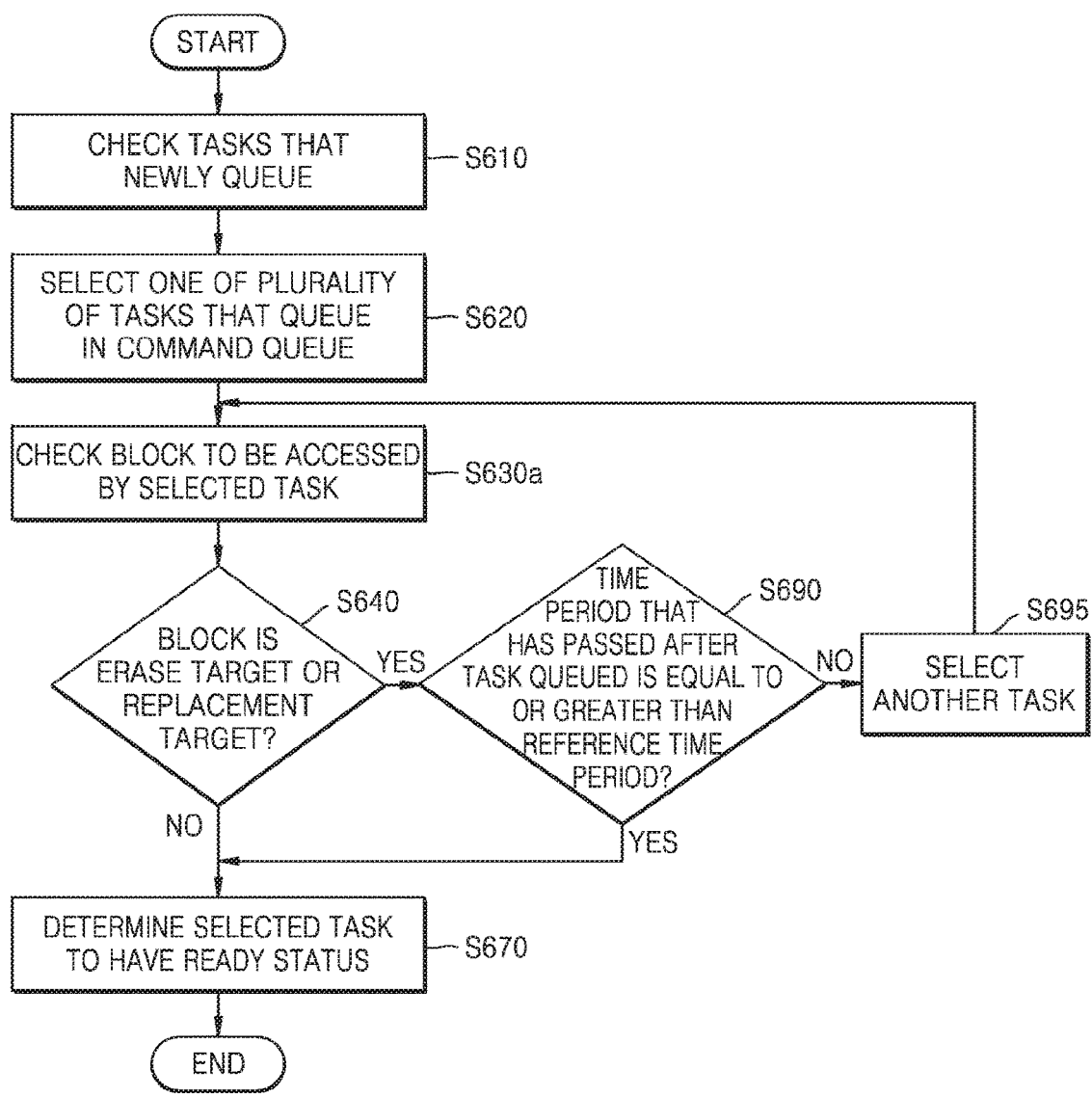
FIG. 19 illustrates an operating method performed by a storage device according to an exemplary embodiment of the inventive concept.

FIG. 19 illustrates an operating method performed by a storage device according to an exemplary embodiment of the inventive concept.

Referring to FIG. 19, the operating method according to the present exemplary embodiment may be similar to the operating method described with reference to FIGS. 15 and 17, and the descriptions described above with reference to FIGS. 15 through 18B may also be applied to the present exemplary embodiment. In operation S610, the plurality of tasks that newly queue are checked. In operation S620, one of the plurality of tasks queuing in the command queue is selected. In operation S630a, a block to be accessed by the selected task is checked. In operation S640, it is determined whether the block is an erase target or a replacement target. As a result of the determination, when the block is neither the erase target nor the replacement target (operation S640: NO), operation S670 is performed. In operation S670, the selected task is determined to have the ready status.

As the result of the determination, when the block is the erase target or the replacement target (operation S640: YES), operation S690 is performed. In operation S690, it is determined whether a time period that has passed after the task queued is greater than or equal to a reference time period. As a result of the determination, when the elapsed time period is less than the reference time period (operation S690: NO), operation S695 is performed. In operation S695, another task is selected. When the elapsed time period is greater than or equal to the reference time period (operation S690: YES), operation S670 is performed.

According to the present exemplary embodiment, even if a task selected from the command queue 112a is an erase target or a replacement target, when the selected task does not have the ready status over a predetermined time period, the selected task may be determined to have the ready status. Accordingly, it is possible to prevent execution of a previously-queuing task from being significantly delayed, so that an operational function of the storage device 100a may be enhanced.

Figure 20:
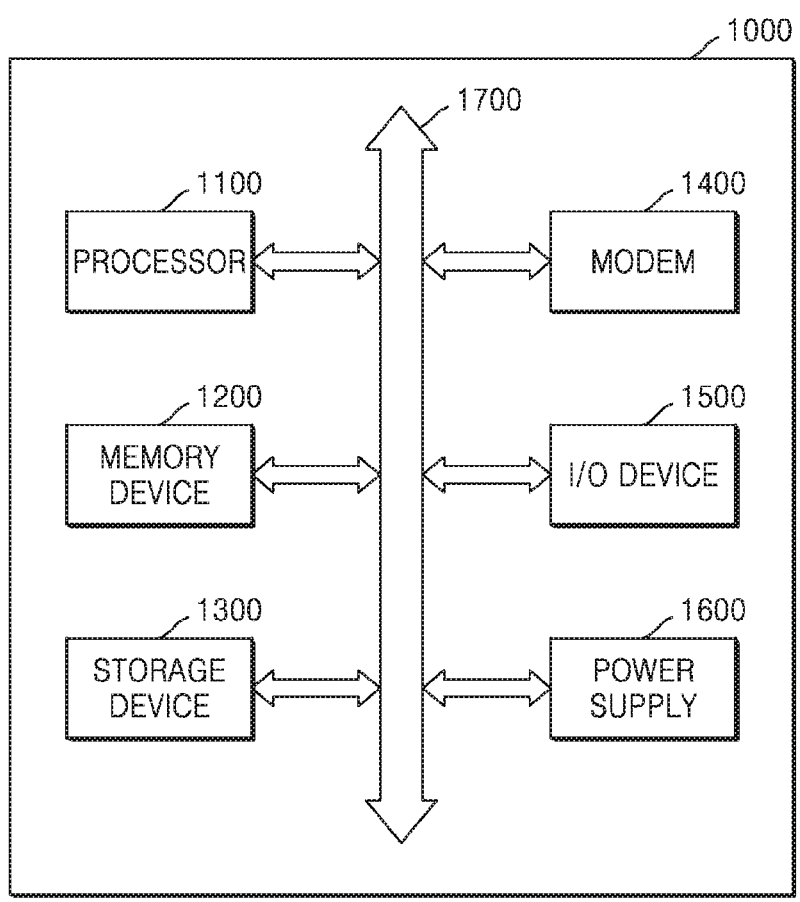
FIG. 20 is a block diagram of an electronic device according to an exemplary embodiment of the inventive concept.

FIG. 20 is a block diagram of an electronic device according to an exemplary embodiment of the inventive concept.

Referring to FIG. 20, a electronic device 1000 may include a processor 1100, a memory device 1200, a storage device 1300, a modem 1400, an I/O device 1500, and a power supply 1600, all of which may be connected to a bus 1700. In the present exemplary embodiment, the storage device 1300 may support a command queue function, and may determine an order of executing tasks based on the degradation information of blocks. In more detail, the storage device 1300 may select one of the plurality of tasks queuing in the command queue, check a block to be accessed by the selected task, and determine whether the block is a read reclaim target or a replacement target. As a result of the determination, when the block is the read reclaim target or the replacement target, a different task may be selected. Otherwise, the selected task may be determined to have the ready status. The descriptions provided above with reference to FIGS. 1 through 19 may be applied to the storage device 1300.

While the inventive concept has been shown and described with reference to exemplary embodiments thereof, it will be understood by those of ordinary skill in the art that various changes in form and details may be made thereto without departing from the spirit and scope of the inventive concept as set forth in the following claims.

What is claimed is:

1. An operating method performed by a storage device including a non-volatile memory, the operating method comprising:
reading data from a first block included in the non-volatile memory;
determining the first block to be a read reclaim target or a replacement target based on a number of error bits in the read data, and storing information indicating whether the first block is the read reclaim target or the replacement target, in a read reclaim/replacement queue;
selecting a first task from among a plurality of tasks queuing in a command queue of the storage device;
checking the first block to be accessed by the first task using a mapping table loaded to the storage device;
determining checking whether the first block is the read reclaim target or the replacement target; target based on the stored information; and
determining an order of executing the first task depending on whether the first block is the read reclaim target or the replacement target,
wherein a read reclaim operation is performed on the read reclaim target and a replacement operation is performed on the replacement target,
wherein the read reclaim operation is an operation of transferring data of the first block to another block, deleting the data from the first block, and reusing the first block, and
wherein the replacement operation is an operation of transferring the data of the first block to a reserved or spare block and using the reserved or spare block instead of the first block for the first task.

2. The operating method of claim 1, wherein determining the order of executing the first task comprises:
delaying the order of executing the first task when the first block is the read reclaim target or the replacement target; and
determining the first task to have a ready status when the first block is neither the read reclaim target nor the replacement target.

3. The operating method of claim 2, wherein delaying the order of executing the first task comprises selecting a second task from among the plurality of tasks,
wherein the second task is a task to access a second block, and
wherein the operating method further comprises:
determining whether the second block is the read reclaim target or the replacement target; and
determining an order of executing the second task depending on whether the second block is the read reclaim target or the replacement target.

4. The operating method of claim 1, wherein checking the first block comprises further checking a first page of the first block to be accessed by the first task using the mapping table.

5. The operating method of claim 4, wherein determining the order of executing the first task comprises:
determining whether the first page is programmed to another block that is not the first block using the mapping table, when the first block is the read reclaim target or the replacement target;
selecting a second task from among the plurality of tasks when the first page is not programmed to another block; and
determining the first task to have the ready status when the first block is neither the read reclaim target nor the replacement target or when the first page is programmed to another block.

6. The operating method of claim 4, wherein determining the order of executing the first task comprises:
programming a page of the first block where a read reclaim has occurred to another block that is not the first block, when the first block is the read reclaim target or the replacement target; and
determining the first task to have the ready status when the first block is neither the read reclaim target nor the replacement target or after programming the page of the first block to another block.

7. The operating method of claim 1, wherein determining the order of executing the first task comprises:
determining whether a first time period that has passed after the first task queued in the command queue is greater than or equal to a reference time period;
selecting a second task from among the plurality of tasks when the first time period is less than the reference time period; and
determining the first task to have the ready status when the first block is neither the read reclaim target nor the replacement target or when the first time period is greater than or equal to the reference time period.

8. The operating method of claim 1, wherein the order of executing the first task is determined using degradation information of the first block, and
the degradation information comprises at least one of a number of read times, a number of program/erase times, a number of error bits of read data, program elapsed time information, or operation temperature information.

9. The operating method of claim 1, further comprising updating a status register of the storage device when the first task is determined to have a ready status.

10. The operating method of claim 9, further comprising:
receiving a status check command from a host; and providing a status response message to the host, after updating the status register and in response to the status check command, wherein the status response message indicates that the first task has the ready status.

11. The operating method of claim 1, wherein the first task is a read task.

12. The operating method of claim 1, wherein the storage device comprises an embedded multi-media card (eMMC).

13. An operating method performed by a storage device including a non-volatile memory, the operating method comprising:

reading data from a first block included in the non-volatile memory;

determining the first block to be a read reclaim target or a replacement target based on a number of error bits in the read data, and storing degradation information indicating whether the first block is the read reclaim target or the replacement target, in a read reclaim/replacement queue;

selecting a first command from among a plurality of commands queuing in a command queue of the storage device;

checking the first block to be accessed by the first command using a mapping table loaded to the storage device; and adjusting an execution schedule with respect to the first command using the degradation information regarding the first block, wherein adjusting the execution schedule comprises:

checking whether the first block is the read reclaim target or the replacement target based on the stored degradation information; and delaying the execution schedule with respect to the first command when the first block is the read reclaim target or the replacement target.

14. The operating method of claim 13, wherein adjusting the execution schedule further comprises:

requesting the host to execute the first command when the first block is neither the read reclaim target nor the replacement target.

15. The operating method of claim 14, wherein the degradation information comprises at least one of a number of read times, a number of program/erase times, a number of error bits of read data, program elapsed time information, or operation temperature information.

16. An operating method performed by a storage device, the operating method comprising:

receiving task setting and address commands for a first task from a host;

checking tasks that newly queue in a command queue of the storage device;

selecting the first task from among a plurality of tasks queuing in the command queue;

checking a first block to be accessed by the first task using a mapping table loaded to the storage device;

determining whether the first block is a read reclaim target or a replacement target;

selecting a second task from among the plurality of tasks when the first block is the read reclaim target or the replacement target; and determining the first task to have a ready status when the first block is neither the read reclaim target nor the replacement target, wherein a read reclaim/replacement queue of the storage device stores 2-bit information for plurality of physical addresses corresponding to a plurality of blocks including the first block, and for each of the plurality of physical addresses, a most significant bit indicates whether one of a read reclaim or a replacement is to be performed on a corresponding block and a least significant bit indicates whether the other of the read reclaim or the replacement is to be performed on the corresponding block.

17. The operating method of claim 16, wherein checking the first block comprises checking a first page of the first block to be accessed by the first task.

18. The operating method of claim 16, further comprising:

updating a status register when it is determined that the first task has the ready status;

receiving, from the host, a status check command for checking statuses stored in the status register; and transmitting, to the host, a status respond message indicating that the first task has the ready status.

19. The operating method of claim 16, wherein when the first block is the read reclaim target or the replacement target, a read reclaim or a replacement is performed on the first block while the second task to access a second block different from the first block is performed.

* * * * *